US012590216B2

(12) United States Patent
Morozumi et al.

(10) Patent No.: US 12,590,216 B2
(45) Date of Patent: Mar. 31, 2026

(54) WATER-BASED INK AND INK SET INCLUDING SAME

(71) Applicant: DNP FINE CHEMICALS CO., LTD., Yokohama (JP)

(72) Inventors: Syunya Morozumi, Yokohama (JP); Yuji Makimoto, Yokohama (JP)

(73) Assignee: DNP FINE CHEMICALS CO., LTD., Kanagawa (JP)

( * ) Notice: Subject to any disclaimer, the term of this patent is extended or adjusted under 35 U.S.C. 154(b) by 234 days.

(21) Appl. No.: 18/566,732

(22) PCT Filed: Jun. 27, 2022

(86) PCT No.: PCT/JP2022/025627
§ 371 (c)(1),
(2) Date: Dec. 4, 2023

(87) PCT Pub. No.: WO2023/276979
PCT Pub. Date: Jan. 5, 2023

(65) Prior Publication Data
US 2024/0270991 A1      Aug. 15, 2024

(30) Foreign Application Priority Data

Jun. 30, 2021      (JP) ................................. 2021-109297

(51) Int. Cl.
*C09D 11/322*      (2014.01)
*C09D 11/40*      (2014.01)
(Continued)

(52) U.S. Cl.
CPC ............ *C09D 11/322* (2013.01); *C09D 11/40* (2013.01); *C09D 11/54* (2013.01); *B41M 5/0011* (2013.01)

(58) Field of Classification Search
CPC ....... C09D 11/322; C09D 11/38; C09D 11/40; C09D 11/54; C09D 11/033;
(Continued)

(56) References Cited

U.S. PATENT DOCUMENTS 8,814,340 B2 * 8/2014 Goto .................... B41M 7/0018
347/100
9,499,711 B2 11/2016 Aoyama et al.
(Continued)

FOREIGN PATENT DOCUMENTS

CN      102574406 A      7/2012
EP      3653678 A1      5/2020
(Continued)

OTHER PUBLICATIONS

Apr. 29, 2025 Office Action issued in Chinese Patent Application No. 202280038609.0.
(Continued)

*Primary Examiner* — John P Zimmermann
(74) *Attorney, Agent, or Firm* — Oliff PLC

(57) ABSTRACT
A water-based ink contains at least a coloring material, water, and an organic solvent, the coloring material containing a pigment, and the organic solvent having a water-octanol partition coefficient of −0.3 or less. The water-based ink makes it possible to suppress white spots, suppress the occurrence of water-based ink filling defects, and produce recorded matter having high image reproducibility.

19 Claims, 1 Drawing Sheet

(51) Int. Cl.
    *C09D 11/54*         (2014.01)
    *B41M 5/00*         (2006.01)

(58) Field of Classification Search
    CPC ............ B41M 5/0017; B41M 5/0023; B41M
               5/0047; B41J 2/01; B41J 2/2107; B41J
               2/2114; B41J 2/2117; D06P 5/30
    See application file for complete search history.

(56)            References Cited

U.S. PATENT DOCUMENTS

| | | | |
|---|---|---|---|
| 9,670,374 | B2 | 6/2017 | Wakabayashi et al. |
| 2012/0128949 | A1 | 5/2012 | Goto |
| 2013/0176369 | A1* | 7/2013 | Gotou ................. B41M 5/0023 |
| | | | 347/100 |
| 2015/0103116 | A1 | 4/2015 | Gotou |
| 2015/0259553 | A1 | 9/2015 | Nakagawa et al. |
| 2016/0272832 | A1 | 9/2016 | Kobayashi et al. |
| 2018/0086112 | A1 | 3/2018 | Matsuzaki |
| 2019/0234015 | A1* | 8/2019 | Chidate ................. D06P 1/6735 |
| 2020/0048488 | A1 | 2/2020 | Wilson et al. |
| 2021/0002504 | A1 | 1/2021 | Iioka et al. |
| 2021/0017414 | A1* | 1/2021 | Asakawa ............... C09D 11/54 |
| 2021/0060993 | A1 | 3/2021 | Hayamizu et al. |
| 2021/0129567 | A1 | 5/2021 | Seguchi et al. |
| 2021/0138817 | A1* | 5/2021 | Arita ................... B41M 5/0023 |
| 2022/0227154 | A1* | 7/2022 | Sato .................... B41M 5/0023 |
| 2023/0257614 | A1 | 8/2023 | Ito |
| 2024/0218198 | A1* | 7/2024 | Hayamizu ............... B41M 5/00 |

FOREIGN PATENT DOCUMENTS

| | | |
|---|---|---|
| JP | 2005-298806 A | 10/2005 |
| JP | 2008-050400 A | 3/2008 |
| JP | 2011-063016 A | 3/2011 |
| JP | 2013-121994 A | 6/2013 |
| JP | 2015-036395 A | 2/2015 |
| JP | 2015-074184 A | 4/2015 |
| JP | 2015-187254 A | 10/2015 |
| JP | 2016-125008 A | 7/2016 |
| JP | 2016-176070 A | 10/2016 |
| JP | 2017-222793 A | 12/2017 |
| JP | 2018-144495 A | 9/2018 |
| JP | 2019-196430 A | 11/2019 |
| JP | 2019-199621 A | 11/2019 |
| JP | 2020-070334 A | 5/2020 |
| JP | 2020-075436 A | 5/2020 |
| JP | 2020-084075 A | 6/2020 |
| JP | 2021-042273 A | 3/2021 |
| JP | 2021-070244 A | 5/2021 |
| WO | 2008/023812 A1 | 2/2008 |
| WO | 2011/021591 A1 | 2/2011 |
| WO | 2019/116906 A1 | 6/2019 |
| WO | 2019/187704 A1 | 10/2019 |
| WO | 2022/044985 A1 | 3/2022 |
| WO | 2022/097503 A1 | 5/2022 |

OTHER PUBLICATIONS

May 28, 2025 Extended European Search report issued in European patent Application No. 22833126.0.

Jul. 12, 2022 Office Action issued in Japanese Application No. 2022-102936.

Aug. 30, 2022 Office Action issued in Japanese Application No. 2022-102936.

* cited by examiner

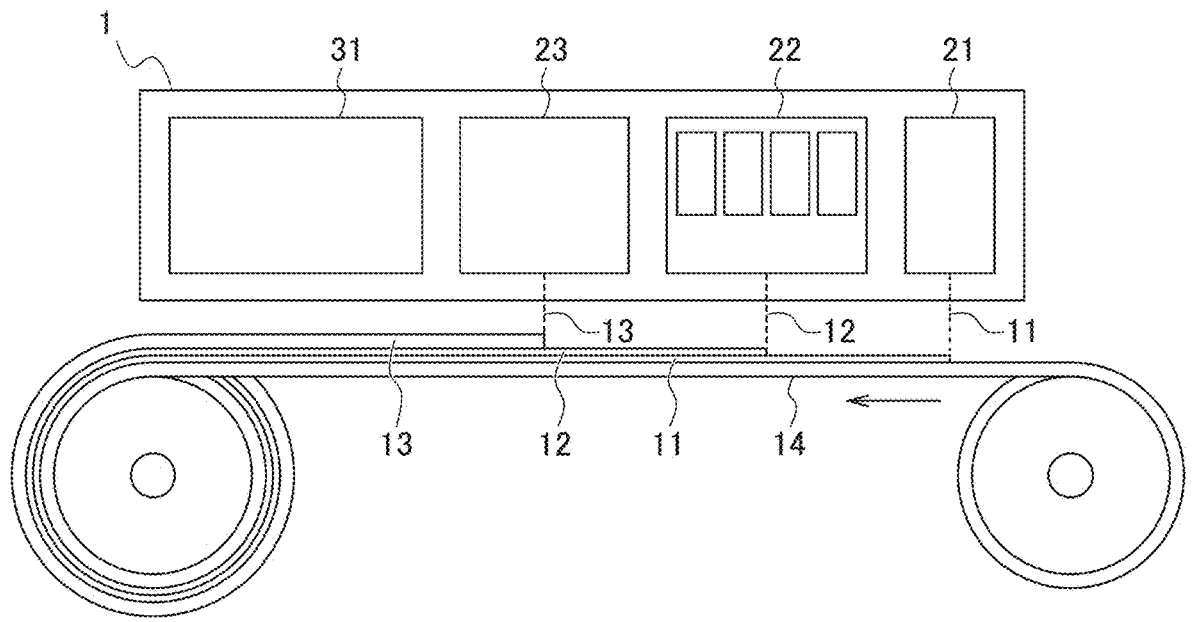

WATER-BASED INK AND INK SET INCLUDING SAME

TECHNICAL FIELD

The present invention relates to a water-based ink and an ink set including the water-based ink.

BACKGROUND ART

Inkjet recording method is a recoding method including ejecting droplets of an ink composition from a very fine nozzle directly onto a substrate, such as a paper sheet, to form printed characters and images. This recording method has spread beyond home-use to office and industrial printing applications since it enables non-contact printing on substrates and easily achieves printing with compact equipment, high-speed printing, low-noise printing, power-saving printing, and color printing.

Ink compositions widely used for the inkjet recording method include water-based inks, which include solutions of various colorants in water or a mixture of water and an organic solvent. Such water-based inks, in which water is a main component, have less impact on the environment and are non-flammable and highly safe for workers.

Inkjet methods include scanning methods and single-pass methods. In the scanning method, a certain amount of ink is ejected in several parts from the inkjet head being moved in the right and left directions. The single-pass method uses a fixed inkjet head and includes passing a substrate once under the fixed inkjet head for the formation of an image. The single-pass method, which can form an image by passing the substrate only once under the inkjet head, is advantageous in that it can produce prints (multilayer products) with high productivity at high speed.

For example, Patent Document 1 discloses a single-pass inkjet recording method characterized by including: ejecting an ink with a low L* value; and finally ejecting an ink with a high L* value and discloses an ink set for use in such a single-pass inkjet recording method. According to Patent Document 2, the disclosed inkjet recording method can be performed with less bleeding (blurring) between color inks and no strike-through on the recording medium (substrate).

CITATION LIST

Patent Document

Patent Document 1: Japanese Unexamined Patent Application, Publication No. 2018-144495

DISCLOSURE OF THE INVENTION

Problems to be Solved by the Invention

A study by the inventors has revealed that when contained in a water-based ink, some organic solvents may cause printing with the water-based ink to suffer from pinholes, a local reduction in print density, or filling defects.

It is an object of the present invention to provide a water-based ink that is less likely to cause pinholes or filling defects during printing and can produce recorded matter with high image reproducibility.

Means for Solving the Problems

As a result of an intensive study for solving the problem described above, the inventors have created a water-based ink containing a specific organic solvent and completed the present invention based on findings that such a water-based ink provides a solution to the problem. Specifically, the present invention provides the following aspects.

(1) A water-based ink including at least: a colorant; water; and an organic solvent, the colorant including a pigment, the organic solvent including an organic solvent having a water-octanol partition coefficient of −0.3 or less.

(2) The water-based ink according to aspect (1), wherein the organic solvent includes an alkanediol-typed organic solvent having a water-octanol partition coefficient of −0.3 or less.

(3) The water-based ink according to aspect (1) or (2), wherein the content of the organic solvent having a water-octanol partition coefficient of −0.3 or less is 1 mass % or more and 50 mass % or less based on the total mass of the water-based ink.

(4) The water-based ink according to any one of aspects (1) to (3), further including a surfactant including a silicone-based surfactant and/or an acetylene glycol-based surfactant.

(5) The water-based ink according to any one of aspects (1) to (4), wherein the water-based ink is to be jetted by an inkjet method.

(6) An ink set including: the water-based ink according to any one of aspects (1) to (5); and a pretreatment ink.

(7) The ink set according to aspect (6), wherein the water-based ink and the pretreatment ink have static surface tensions satisfying the following relation:

the static surface tension $S_P$ of the pretreatment ink<the static surface tension $S_C$ of the water-based ink.

(8) The ink set according to aspect (6) or (7), further including an overcoat ink for forming an overcoat layer on a surface of a recorded matter.

(9) The ink set according to aspect (8), wherein the pretreatment ink, the water-based ink, and the overcoat ink have static surface tensions satisfying the following relation:

the static surface tension $S_O$ of the overcoat ink≤the static surface tension $S_P$ of the pretreatment ink<the static surface tension $S_C$ of the water-based ink.

(10) An inkjet recording method using the ink set according to any one of aspects (6) to (9), the inkjet recording method including jetting each of the inks comprised in the ink set onto a substrate by an inkjet method.

(11) The inkjet recording method according to aspect (10), wherein each of the inks comprised in the ink set is jetted onto the substrate by an inkjet method, such that drying mechanism is not placed between at least one adjacent pairs of ejection parts jetting each of the inks comprised in the ink set.

(12) The inkjet recording method according to aspect (10) or (11), further including drying each of the inks comprised in the ink set after the ink jetting.

(13) A method of producing a recorded matter using the ink set according to any one of aspects (6) to (9), the method including jetting each of the inks of the ink set onto a substrate.

(14) A device for jetting the comprised in the ink set by an inkjet method according to any one of aspects (6) to (9).

(15) The device according to aspect (14), wherein the device includes ejection units for respectively jetting the inks comprised in the ink set by an inkjet method, and the device has no drying mechanism between at least one of adjacent pairs of the ejection units.

(16) The device according to aspect (14) or (15), further including drying mechanisms for respectively drying the inks of the ink set after ink jetting.

(17) A recorded matter including: a recording medium; a water-based ink layer made from the water-based ink according to any one of aspects (1) to (5); and an overcoat layer provided on top of the water-based ink layer.

Effects of the Invention

The water-based ink of the present invention is less likely to cause pinholes or filling defects during printing and can produce recorded matter with high image reproducibility.

BRIEF DESCRIPTION OF THE DRAWINGS

FIG. 1 is a diagram showing a device suitable for use in jetting the inks of an ink set according to an embodiment of the present invention.

PREFERRED MODE FOR CARRYING OUT THE INVENTION

Hereinafter, specific embodiments of the present invention will be described in detail. The embodiments described below are not intended at all to limit the present invention and may be appropriately altered or modified within the scope of the object of the present invention.

Water-Based Ink

An embodiment of the present invention is directed to a water-based ink including: a colorant; water; and an organic solvent. The water-based ink, in which water is a main component, has less impact on the environment and is non-flammable and highly safe for workers.

In the water-based ink, the organic solvent includes an organic solvent having a water-octanol partition coefficient of −0.3 or less. The term "water-octanol partition coefficient" means the common logarithm of the ratio between the concentrations of a chemical dissolved in equilibrium in the two solvent phases: water and 1-octanol.

If the water-based ink has too high an ability to penetrate into the substrate (recording medium), a local reduction in print density and filling defects may occur during printing with the water-based ink due to a reduced amount of the water-based ink remaining on the substrate surface. A study for the present invention has revealed that the water-based ink containing water and an organic solvent having a water-octanol partition coefficient of −0.3 or less can have a reduced ability to penetrate into the substrate (recording medium). The water-based ink with such a reduced ability to penetrate into the substrate (recording medium) can be effectively prevented from causing a local reduction in print density or filling defects, so that it can form images with high reproducibility.

The water-based ink containing water and the organic solvent with a water-octanol partition coefficient of −0.3 or less, which has a high affinity for water, can have a small contact angle (in other words, a high wettability) on the substrate and can tend to wet and spread on the substrate (recording medium) more than to penetrate into it.

The water-based ink according to this embodiment and the pretreatment ink and overcoat ink of the ink set described later may be applied by, for example, gravure printing, flexo printing, spray printing, screen printing, coater printing, or any other printing method. In particular, inkjet printing is preferred since it is advantageous in producing recorded matter in a small lot.

Specifically, an ink set may be provided, including: the water-based ink according to this embodiment, the pretreatment ink described later, and optionally an overcoat ink, and the inks of such an ink set may be ejected by an inkjet method. In such a case, layers of the water-based ink and the overcoat ink can be formed at a time on the surface, which allows high-speed production of a print including these layers and thus allows production of recorded matter with high image reproducibility and high productivity.

Next, each of the components in the water-based ink according to this embodiment will be described.

Water

The water-based ink contains water as a main component. The water is preferably deionized water or any other type of water free of various types of ions. The content of water in the water-based ink may be any suitable level that allows dispersion or dissolution of each component. The content of water in the water-based ink preferably has a lower limit of 30 mass % or more, more preferably 45 mass % or more, even more preferably 50 mass % or more, based on the total mass of the water-based ink. The content of water in the water-based ink preferably has an upper limit of 85 mass % or less, more preferably 80 mass % or less, even more preferably 75 mass % or less, based on the total mass of the water-based ink.

Organic Solvent

The water-based ink according to this embodiment contains an organic solvent. The organic solvent is capable of dispersing or dissolving the colorant and other components. Since the water-based ink according to this embodiment contains water, the organic solvent preferably includes a water-soluble solvent.

Examples of the organic solvent include $C_1$ to $C_5$ alkyl alcohols, such as methyl alcohol, ethyl alcohol, n-propyl alcohol, isopropyl alcohol, n-butyl alcohol, sec-butyl alcohol, tert-butyl alcohol, isobutyl alcohol, and n-pentanol; amides, such as formamide, acetamide, propanamide, butanamide, isobutylamide, pentanamide, N-methylformamide, N-methylacetamide, N-methylpropanamide, N-methylbutanamide, N-methylisobutylamide, N-methylpentanamide, N-ethylformamide, N-ethylacetamide, N-ethylpropanamide, N-ethylbutanamide, N-ethylisobutylamide, N-methylpentanamide, N-propylformamide, N-propylacetamide, N-propylpropanamide, N-propylbutanamide, N-propylisobutylamide, N-propylpentanamide, N-isopropylformamide, N-isopropylacetamide, N-isopropylpropanamide, N-isopropylbutanamide, N-isopropylisobutylamide, N-isopropylpentanamide, N-butylformamide, N-butylacetamide, N-butylpropanamide, N-butylbutanamide, N-butylisobutylamide, N-butylpentanamide, N,N-dimethylformamide, N,N-dimethylacetamide, N,N-dimethylpropanamide, N,N-dimethylbutanamide, N,N-dimethylisobutylamide, N,N-dimethylpentanamide, N,N-diethylformamide, N,N-diethylacetamide, N,N-diethylpropanamide, N,N-diethylbutanamide, N,N-diethylisobutylamide, N,N-diethylpentanamide, N,N-dipropylformamide, N,N-dipropylacetamide, N,N-dipropylpropanamide, N,N-dipropylbutanamide, N,N-dipropylisobutylamide, N,N-dipropylpentanamide, N,N-diisopropylformamide, N,N-diisopropylacetamide, N,N-diisopropylpropanamide, N,N-diisopropylbutanamide, N,N-diisopropylisobutylamide, N,N-diisopropylpentanamide, N,N-dibutylformamide, N,N-dibutylacetamide, N,N-dibutylpropanamide, N,N-dibutylbutanamide, N,N-dibutylisobutylamide, N,N-dibutylpentanamide, N-ethyl-N-meth-ylformamide, N-ethyl-N-methylacetamide, N-ethyl-N-methylpropanamide, N-ethyl-N-methylbutanamide, N-ethyl-N-methylisobutylamide, N-ethyl-N-methylpentana-mide, N-methyl-N-propylformamide, N-methyl-N-propy-lacetamide, N-methyl-N-propylpropanamide, N-methyl-N-propylbutanamide, N-methyl-N-propylisobutylamide, N-methyl-N-propylpentanamide, N-ethyl-N-propylforma-mide, N-ethyl-N-propylacetamide, N-ethyl-N-propylpro-panamide, N-ethyl-N-propylbutanamide, N-ethyl-N-propy-lisobutylamide, and N-ethyl-N-propylpentanamide; ketones or keto alcohols, such as acetone and diacetone alcohol; ethers, such as tetrahydrofuran and dioxane; oxyethylene or oxypropylene copolymers, such as polyethylene glycol and polypropylene glycol; diols, such as ethylene glycol, pro-pylene glycol, diethylene glycol, dipropylene glycol, 1,3-propanediol, isobutylene glycol, triethylene glycol, tripro-pylene glycol, tetraethylene glycol, 1,3-propanediol, 2-methyl-1,2-propanediol, 2-methyl-1,2-propanediol, 1,2-butanediol, 1,3-butanediol, 1,4-butanediol, 1,2-pentanediol, 1,3-pentanediol, 1,2-hexanediol, 1,5-pentanediol, 1,6-hexanediol, 2-methyl-2,4-pentanediol, 3-methyl-1,3-butane-diol, 3-methyl-1,5-pentanediol, and 2-methyl-2,4-pen-tanediol; triols, such as glycerol, trimethylolethane, trimethylolpropane, and 1,2,6-hexanetriol; tetrahydric alco-hols, such as meso-erythritol and pentaerythritol; monoalkyl ethers, such as ethylene glycol monomethyl (or ethyl, iso-propyl, n-butyl, isobutyl, n-hexyl, or 2-ethylhexyl) ether, diethylene glycol monomethyl (or ethyl, isopropyl, n-butyl, isobutyl, n-hexyl, or 2-ethylhexyl) ether, triethylene glycol monomethyl (or ethyl, propyl, isopropyl, n-butyl, isobutyl, tert-butyl, pentyl, n-hexyl, or 2-ethylhexyl) ether, propylene glycol monomethyl (or ethyl, propyl, isopropyl, n-butyl, isobutyl, tert-butyl, pentyl, n-hexyl, or 2-ethylhexyl) ether, dipropylene glycol monomethyl (or ethyl, propyl, isopropyl, n-butyl, isobutyl, tert-butyl, pentyl, n-hexyl, or 2-ethyl-hexyl) ether, and tripropylene glycol monomethyl (or ethyl, propyl, isopropyl, n-butyl, isobutyl, tert-butyl, pentyl, n-hexyl, or 2-ethylhexyl) ether; polyhydric alcohol dialkyl ethers, such as diethylene glycol dimethyl ether, diethylene glycol diethyl ether, diethylene glycol ethyl methyl ether, triethylene glycol dimethyl ether, triethylene glycol diethyl ether, triethylene glycol ethyl methyl ether, tetraethylene glycol dimethyl ether, tetraethylene glycol diethyl ether, tetraethylene glycol ethyl methyl ether, propylene glycol dimethyl ether, propylene glycol diethyl ether, propylene glycol ethyl methyl ether, dipropylene glycol dimethyl ether, dipropylene glycol diethyl ether, dipropylene glycol ethyl methyl ether, tripropylene glycol dimethyl ether, tripropyl-ene glycol diethyl ether, and tripropylene glycol ethyl methyl ether; acetates, such as ethylene glycol monomethyl (or ethyl, propyl, isopropyl, n-butyl, isobutyl, tert-butyl, pentyl, n-hexyl, or 2-ethylhexyl) ether acetate, diethylene glycol monomethyl (or ethyl, propyl, isopropyl, n-butyl, isobutyl, tert-butyl, pentyl, n-hexyl, or 2-ethylhexyl) ether acetate, triethylene glycol monomethyl (or ethyl, propyl, isopropyl, n-butyl, isobutyl, tert-butyl, pentyl, n-hexyl, or 2-ethylhexyl) ether acetate, propylene glycol monomethyl (or ethyl, propyl, isopropyl, n-butyl, isobutyl, tert-butyl, pentyl, n-hexyl, or 2-ethylhexyl) ether acetate, dipropylene glycol monomethyl (or ethyl, propyl, isopropyl, n-butyl, isobutyl, tert-butyl, pentyl, n-hexyl, or 2-ethylhexyl) ether acetate, tripropylene glycol monomethyl (or ethyl, propyl, isopropyl, n-butyl, isobutyl, tert-butyl, pentyl, n-hexyl, or 2-ethylhexyl) ether acetate, ethylene glycol diacetate, dieth-ylene glycol diacetate, propylene glycol diacetate, and dipropylene glycol diacetate; lactones, such as γ-butyrolactone, α-methylene-γ-butyrolactone, ε-caprolactone, γ-vale-rolactone, γ-hexanolactone, γ-heptalactone, δ-valerolactone, δ-hexanolactone, δ-heptalactone, δ-octalactone, δ-nonalac-tone, δ-decalactone, δ-undecalactone, γ,γ-dimethyl-γ-buty-rolactone, α-methyl-γ-butyrolactone, γ-crotolactone, α-methylene-γ-butyrolactone, β-methyl-γ-butyrolactone, and δ-methylvalerolactone; carbonate esters, such as 2,3-butylene carbonate, ethylene carbonate, and propylene car-bonate; oxazolidinone solvents, such as 3-methyl-2-oxazo-lidinone, 3-ethyl-2-oxazolidinone, and N-vinylmethyloxazolidinone; $C_1$ to $C_5$ alkyl alcohols, such as methyl alcohol, ethyl alcohol, n-propyl alcohol, isopropyl alcohol, n-butyl alcohol, sec-butyl alcohol, tert-butyl alco-hol, isobutyl alcohol, and n-pentanol; monohydric alcohols, such as 3-methoxy-3-methyl-1-butanol, 3-methoxy-1-pro-panol, 1-methoxy-2-propanol, and 3-methoxy-n-butanol; ketones or keto alcohols, such as acetone and diacetone alcohol; ethers, such as tetrahydrofuran and dioxane; oxy-ethylene or oxypropylene copolymers, such as polyethylene glycol and polypropylene glycol; diols, such as ethylene glycol, propylene glycol, diethylene glycol, dipropylene glycol, 1,3-propanediol, isobutylene glycol, triethylene gly-col, tripropylene glycol, tetraethylene glycol, 1,3-propane-diol, 2-methyl-1,2-propanediol, 2-methyl-1,2-propanediol, 1,2-butanediol, 1,3-butanediol, 1,4-butanediol, 1,2-pen-tanediol, 1,2-hexanediol, 1,5-pentanediol, 1,6-hexanediol, 2-methyl-2,4-pentanediol, 3-methyl-1,3-butanediol, 3-methyl-1,5-pentanediol, and 2-methyl-2,4-pentanediol; triols, such as glycerol, trimethylolethane, trimethylolpro-pane, and 1,2,6-hexanetriol; tetrahydric alcohols, such as meso-erythritol and pentaerythritol; alkanolamines, such as monoethanolamine, diethanolamine, triethanolamine, N-methylethanolamine, N-ethylethanolamine, N-butyletha-nolamine, N-methyldiethanolamine, N-ethyldietha-nolamine, and N-butyldiethanolamine; nitrogen-containing heterocyclic compounds, such as N-methyl-2-pyrrolidone, 2-pyrrolidone, and 1,3-dimethyl-2-imidazolidinone; cyclic compounds, such as γ-butyrolactone and sulfolane; morpho-lines, such as N-methylmorpholine, N-ethylmorpholine, and N-formylmorpholine; and terpene solvents.

The water-based ink according to this embodiment con-tains an organic solvent having a water-octanol partition coefficient of −0.3 or less.

The water-based ink containing water and the organic solvent with a water-octanol partition coefficient of −0.3 or less, which has a high affinity for water, can have a small contact angle (in other words, a high wettability) on the substrate and can tend to wet and spread on the substrate (recording medium) more than to penetrate into it, so that it can have a reduced ability to penetrate into the substrate (recording medium) and be effectively prevented from caus-ing filling defects.

Examples of the organic solvent with a water-octanol partition coefficient of −0.3 or less include 1,3-propanediol, 1,2-propanediol, 1,2-butanediol, 1,4-butanediol, 1,5-pen-tanediol, 1,6-hexanediol, 3-methyl-1,3 butanediol, neopen-tyl glycol, diethylene glycol monomethyl ether, diethylene glycol monoethyl ether, N-formylmorpholine, 4-(2-hy-droxyethyl) morpholine, N-hydroxyethylene urea, and eth-ylene urea.

In particular, the organic solvent with a water-octanol partition coefficient of −0.3 or less is preferably an alkane-diol-typed organic solvent.

The water-octanol partition coefficient is more preferably −0.70 or less, even more preferably −0.90 or less, further-more preferably −1.05 or less.

The content of the organic solvent in the water-based ink may be any suitable level that allows dispersion or dissolution of each component. The content of the organic solvent in the water-based ink preferably has a lower limit of 5 mass % or more, more preferably 10 mass % or more, even more preferably 12 mass % or more, based on the total mass of the water-based ink. The content of the organic solvent in the water-based ink preferably has an upper limit of 50 mass % or less, more preferably 45 mass % or less, even more preferably 40 mass % or less, based on the total mass of the water-based ink.

The content of the organic solvent with a water-octanol partition coefficient of −0.3 or less (e.g., an alkanediol-typed organic solvent with a water-octanol partition coefficient of −0.3 or less) in the water-based ink, although may be any suitable level, preferably has a lower limit of 1 mass % or more, more preferably 3 mass % or more, even more preferably 5 mass % or more, based on the total mass of the water-based ink. The content of the organic solvent with a water-octanol partition coefficient of −0.3 or less in the water-based ink preferably has an upper limit of 50 mass % or less, more preferably 30 mass % or less, even more preferably 23 mass % or less, based on the total mass of the water-based ink.

Resin

The water-based ink according to this embodiment may contain a resin. When added to the water-based ink, the resin can control the penetration of the pigment into the substrate (recording medium) and promote the fixing of the colorant, which can further effectively prevent filling defects. For high fixing ability and for formation of a highly water-resistant water-based ink layer, the resin is preferably in the form of a resin emulsion. In the form of a resin emulsion, the resin can disperse as fine particles with high stability in the water-based ink thanks to steric and electrostatic repulsive forces.

Specifically, the resin may include at least one resin or copolymer resin selected from the group consisting of acrylic resin, styrene-acrylic resin, polystyrene resin, polyester resin, vinyl chloride resin, vinyl acetate resin, vinyl chloride-vinyl acetate copolymer resin, polyethylene resin, polyurethane resin, silicone (silicon) resin, acrylamide resin, epoxy resin, polycarbonate resin, and polystyrene resin, or may be any mixture thereof. These resins are preferred because they can provide higher levels of water resistance and solvent resistance. In particular, the resin preferably includes acrylic resin, which has at least one monomer unit that forms an acrylic skeleton, so that the resin can provide high ejection stability, water resistance, and solvent resistance.

Examples of the commercially available resin emulsion include, but are not limited to, ACRIT WEM-031U, WEM-200U, WEM-321, WEM-3000, WEM-202U, and WEM-3008 (acrylic-urethane resin emulsions manufactured by Taisei Fine Chemical Co., Ltd.); ACRIT UW-550CS, UW-223SX, AKW-107, and RKW-500 (acrylic resin emulsions manufactured by Taisei Fine Chemical Co., Ltd.); LUBRIJET N240 (acrylic resin emulsion manufactured by The Lubrizol Corporation); SUPERFLEX 150, 210, 470, 500M, 620, 650, E2000, E4800, and R5002 (urethane resin emulsions manufactured by DKS Co., Ltd.); VINYBLAN 701 FE35, 701 FE50, 701 FE65, 700, 701, 711, 737, and 747 (vinyl chloride-acrylic resin emulsions manufactured by Nissin Chemical Industry Co., Ltd.); VINYBLAN 2706 and 2685 (acrylic resin emulsions manufactured by Nissin Chemical Industry Co., Ltd.); MOVINYL 743N, 6520, 6600, 6820, 7470, and 7720 (acrylic resin emulsions manufactured by Japan Coating Resin Co., Ltd.); PRIMAL AC-261P and AC-818 (acrylic resin particle emulsions manufactured by The Dow Chemical Company); NeoCryl A2091, A2092, A639, A655, and A662 (styrene-acrylic resin particle emulsions manufactured by DSM Coating Resins Ltd.); QE-1042 and KE-1062 (styrene-acrylic resin particle emulsions manufactured by Seiko PMC Corporation); JE-1056 (acrylic resin particle emulsion manufactured by Seiko PMC Corporation); JONCRYL 7199 and PDX-7630A (styrene-acrylic resin emulsions manufactured by BASF Japan); CHALINE R 170BX (silicone-acrylic resin emulsion manufactured by Nissin Chemical Industry Co., Ltd.); TAKELAC W-6010 (urethane resin emulsion manufactured by Mitsui Chemicals, Inc.); Elitel KA-5071S (polyester resin emulsion manufactured by Unitika Ltd.); and Polysol AP-1350 (acrylic resin emulsion manufactured by Showa Denko).

The content of the resin (resin emulsion) in the water-based ink may be any suitable level. The content of the resin (resin emulsion) in the water-based ink preferably has a lower limit of 0.05 mass % or more, more preferably 0.1 mass % or more, even more preferably 0.5 mass % or more, furthermore preferably 1 mass % or more, based on the total mass of the water-based ink. The water-based ink with this feature can have a reduced ability to penetrate into the substrate (recording medium) and can be effectively prevented from causing a local reduction in print density or filling defects, so that it can form images with high reproducibility. The content of the resin in the water-based ink preferably has an upper limit of 15 mass % or less, more preferably 12 mass % or less, even more preferably 10 mass % or less, based on the total mass of the water-based ink. This feature allows the resin to have higher dispersion stability. In particular, when jetted onto the substrate surface by an inkjet method, the water-based ink containing 15 mass % or less of the resin can have more stable jettability.

The resin emulsion preferably has an average particle size of 30 nm or more, more preferably 40 nm or more, even more preferably 50 nm or more. The resin emulsion preferably has an average particle size of 300 nm or less, more preferably 270 nm or less, even more preferably 250 nm or less. In the water-based ink, the resin emulsion with these features can have higher dispersion stability. In particular, when jetted onto the surface of the recording medium by an inkjet method, the water-based ink containing the resin at least partially in the form of a resin emulsion can have more stable jettability. In this embodiment, the average particle size of the resin emulsion can be measured at a temperature of 25° C. using a fiber optics particle size analyzer (Model FPAR-1000 manufactured by Otsuka Electronics Co., Ltd.).

For formation of a water-resistant, water-based ink layer, the resin emulsion preferably has a mass average molecular weight of 10,000 or more, more preferably 50,000 or more, even more preferably 100,000 or more. For ink composition stability, the resin emulsion preferably has a mass average molecular weight of 1,000,000 or less, more preferably 700,000 or less, even more preferably 500,000 or less. In this embodiment, the molecular weight of the resin refers to the mass average molecular weight Mw, which is the value measured by GPC (gel permeation chromatography). The mass average molecular weight Mw may be determined using HLC-8120GPC manufactured by Tosoh Corporation and polystyrene standards for calibration curve.

Colorant

The water-based ink according to this embodiment contains a colorant. The water-based ink containing a colorant can form a recorded matter on the substrate surface or can form a recording layer, which forms an image in a desired pattern. The colorant may be a dye or a pigment. Preferably, the colorant is a pigment.

The pigment may be one used for inkjet ink in the conventional art, such as barium sulfate, iron oxide, zinc oxide, barium carbonate, barium sulfate, silica, clay, talc, titanium oxide, calcium carbonate, synthetic mica, alumina, or any other inorganic pigment, or an organic pigment. These pigments may be used alone, or two or more of these pigments may be used in combination. Examples of the organic pigment include insoluble azo pigments, soluble azo pigments, dye derivatives, phthalocyanine organic pigments, quinacridone organic pigments, perylene organic pigments, perinone organic pigments, azomethine organic pigments, anthraquinone organic pigments (anthrone organic pigments), xanthene organic pigments, diketopyrrolopyrrole organic pigments, dioxazine organic pigments, nickel azo pigments, isoindolinone organic pigments, pyranthrone organic pigments, thioindigo organic pigments, condensed azo compound organic pigments, benzimidazolone organic pigments, quinophthalone organic pigments, isoindoline organic pigments, organic solid solution pigments, such as quinacridone solid solution pigments and perylene solid solution pigments, and other pigments, such as carbon black.

Examples of the organic pigment shown in Color Index (C.I.) number include C.I. Pigment Yellow 1, 2, 3, 12, 13, 14, 16, 17, 20, 24, 73, 74, 75, 83, 93, 95, 97, 98, 109, 110, 114, 117, 120, 125, 128, 129, 130, 137, 138, 139, 147, 148, 150, 151, 153, 154, 155, 166, 168, 180, 185, 213, and 214, C.I. Pigment Red 5, 7, 9, 12, 48, 48:2, 48:3, 49, 52, 53, 57, 57:1, 97, 112, 122, 123, 146, 149, 150, 168, 176, 177, 180, 184, 185, 192, 202, 206, 208, 209, 213, 215, 216, 217, 220, 223, 224, 226, 227, 228, 238, 240, 254, 269, and 291, C.I. Pigment Orange 16, 36, 43, 51, 55, 59, 61, 64, 71, and 73, C.I. Pigment Violet 19, 23, 29, 30, 37, 40, and 50, C.I. Pigment Blue 15, 15:1, 15:3, 15:4, 15:6, 16, 22, 60, and 64, C.I. Pigment Green 7, 36, 58, 59, 62, and 63, C.I. Pigment Brown 23, 25, and 26, and C.I. Pigment Black 7.

Examples of the inorganic pigment include titanium oxide, barium sulfate, calcium carbonate, zinc oxide, lead sulfate, lead yellow, zinc yellow, rouge (red iron (III) oxide), cadmium red, ultramarine, ferric hexacyanoferrate, chromic oxide green, cobalt green, amber, titanium black, synthetic iron black, and inorganic solid solution pigments.

Examples of the dye for use in the water-based ink according to this embodiment include azo dyes, benzoquinone dyes, naphthoquinone dyes, anthraquinone dyes, cyanine dyes, squarylium dyes, croconium dyes, merocyanine dyes, stilbene dyes, diarylmethane dyes, triarylmethane dyes, fluoran dyes, spiropyran dyes, phthalocyanine dyes, indigo dyes such as indigoid, fulgide dyes, nickel complex dyes, and azulene dyes.

The pigment may be in the form of particles with any average dispersion diameter that allows the desired color to be produced. For good dispersion stability and sufficient coloring power, the average dispersion diameter of the pigment particles preferably has a lower limit of 10 nm or more, more preferably 20 nm or more, even more preferably 30 nm or more, while the average dispersion diameter depends on the type of the pigment. The average dispersion diameter of the pigment particles preferably has an upper limit of 300 nm or less, more preferably 250 nm or less, even more preferably 200 nm or less. With an average dispersion diameter of 300 nm or less, the pigment particles will be less likely to cause inkjet head nozzle clogging and will form homogeneous images with high reproducibility. With an average dispersion diameter of 10 nm or more, the pigment particles can form printed products with good lightfastness. In this embodiment, the average dispersion diameter of the pigment particles is the average particle size (D50) measured under conditions at 25° C. using a fiber optics particle size analyzer (Model FPAR-1000 manufactured by Otsuka Electronics Co., Ltd.).

The pigment content of the water-based ink may be any level that allows the formation of the desired image and may be adjusted as needed. Specifically, the pigment content of the water-based ink preferably has a lower limit of 0.05 mass % or more, more preferably 0.08 mass % or more, even more preferably 0.1 mass % or more, based on the total mass of the water-based ink, while it depends on the type of the pigment. The pigment content of the water-based ink preferably has an upper limit of 20 mass % or less, more preferably 15 mass % or less, even more preferably 10 mass % or less, based on the total mass of the water-based ink. With a pigment content of 0.05 mass % or more or 20 mass % or less, the water-based ink can have a good balance between pigment dispersion stability and coloring power.

Pigment Dispersant

The water-based ink according to this embodiment may contain a pigment dispersant. As used herein, the term "pigment dispersant" refers to a resin or surfactant that can adhere to part of the pigment surface and function to increase the dispersibility of the pigment in the ink.

The water-based ink according to this embodiment may contain any type of pigment dispersant. For example, the pigment dispersant may be a cationic surfactant, an anionic surfactant, a nonionic surfactant, an amphoteric surfactant, a silicone (silicon) surfactant, or a fluorinated surfactant. In particular, the surfactant is preferably a polymer surfactant (polymer dispersant), such as that shown below.

The pigment dispersant, which the water-based ink according to this embodiment may contain, is preferably a water-soluble polymer dispersant. Examples of the water-soluble polymer dispersant include dispersants having a polyester main chain, a polyacrylic main chain, a polyurethane main chain, a polyamine main chain, or a polycaprolactone main chain and a side chain having a polar group, such as amino, carboxy, sulfo, or hydroxy. Examples include (co) polymers of unsaturated carboxylic acid esters, such as polyacrylic acid esters; copolymers of an aromatic vinyl compound, such as styrene or α-methylstyrene, and an unsaturated carboxylic acid ester, such as an acrylic acid ester; (partial) amine salts, (partial) ammonium salts, or (partial) alkylamine salts of (co) polymers of an unsaturated carboxylic acid, such as polyacrylic acid; copolymers of hydroxyl-containing unsaturated carboxylic acid esters, such as hydroxyl-containing polyacrylic acid esters, and modifications thereof; polyurethanes; unsaturated polyamides; polysiloxanes; long-chain polyaminoamide phosphates; polyethyleneimine derivatives (amides resulting from the reaction of poly(lower alkylene imine) with free carboxyl-containing polyester, and bases thereof); and polyallylamine derivatives (reaction products resulting from the reaction of polyallylamine with one or more compounds selected from the three compounds: free carboxyl-containing polyester, free-carboxyl-containing polyamide, or a free-carboxyl-containing ester-amide condensation product (polyester amide)). In particular, a water-soluble polymer dispersant including (meth)acrylic resin is preferred for ink dispersion stability and printed image clarity.

Examples of the water-soluble polymer dispersant include SMA 1440, SMA 2625, SMA 17352, SMA 3840, SMA 1000, SMA 2000, and SMA 3000 manufactured by Cray Valley; JONCRYL 67, JONCRYL 678, JONCRYL 586, JONCRYL 611, JONCRYL 680, JONCRYL 682, JON-CRYL 690, JONCRYL 819, JONCRYL-JDX 5050, EFKA 4550, EFKA 4560, EFKA 4585, EFKA 5220, EFKA 6230, and Dispex Ultra PX 4575 manufactured by BASF Japan; SOLSPERSE 20000, SOLSPERSE 27000, SOLSPERSE 40000, SOLSPERSE 41000, SOLSPERSE 41090, SOL-SPERSE 43000, SOLSPERSE 44000, SOLSPERSE 45000, SOLSPERSE 46000, SOLSPERSE 47000, SOLSPERSE 53095, SOLSPERSE 54000, SOLSPERSE 64000, SOL-SPERSE 65000, SOLSPERSE 66000, SOLSPERSE J400, SOLSPERSE W100, SOLSPERSE W200, SOLSPERSE W320, and SOLSPERSE WV400 manufactured by The Lubrizol Corporation; ANTI-TERRA-250, BYKJET-9150, BYKJET-9151, BYKJET-9152, BYKJET-9170, DIS-PERBYK-102, DISPERBYK-168, DISPERBYK-180, DIS-PERBYK-184, DISPERBYK-185, DISPERBYK-187, DIS-PERBYK-190, DISPERBYK-191, DISPERBYK-193, DISPERBYK-194N, DISPERBYK-198, DISPERBYK-199, DISPERBYK-2010, DISPERBYK-2012, DIS-PERBYK-2013, DISPERBYK-2014, DISPERBYK-2015, DISPERBYK-2018, DISPERBYK-2019, DISPERBYK-2055, DISPERBYK-2060, DISPERBYK-2061, DIS-PERBYK-2081, and DISPERBYK-2096 manufactured by BYK-Chemie; TEGO DISPERS 650, TEGO DISPERS 651, TEGO DISPERS 652, TEGO DISPERS 655, TEGO DIS-PERS 660C, TEGO DISPERS 670, TEGO DISPERS 715W, TEGO DISPERS 740W, TEGO DISPERS 741W, TEGO DISPERS 750W, TEGO DISPERS 752W, TEGO DISPERS 755W, TEGO DISPERS 757W, TEGO DISPERS 760W, TEGO DISPERS 761W, TEGO DISPERS 765W, ZETASPERSE 170, ZETASPERSE 179, ZETASPERSE 182, ZETASPERSE 3100, ZETASPERSE 3400, ZETASSPERSE 3700, and ZETASPERSE 3800 manufac-tured by Evonik Industries; and SN-DISPERSANT 2010, SN-DISPERSANT 2060, SN-DISPERSANT 4215, SN-DISPERSANT 5027, SN-DISPERSANT 5029, SN-DISPERSANT 5034, SN-DISPERSANT 5468, NOP-CALL 5200, NOPCOSANT K, NOPCOSANT R, NOP-COSPERSE 44-C, NOPCOSPERSE 6100, and NOP-COSPERSE 6150 manufactured by San Nopco Limited. These pigment dispersants can be advantageously used for the water-based ink according to this embodiment.

The pigment for use in the water-based ink according to this embodiment may be in the form of a pigment dispersion, which contains the pigment dispersed with the aid of the pigment dispersant in the water-soluble solvent. Alterna-tively, the pigment for use in the water-based ink according to this embodiment may be a self-dispersing pigment with its surface modified directly with a hydrophilic group. Such a self-dispersing pigment may be in the form of a pigment dispersion. In this embodiment, the pigment for use in the inkjet recording ink may include a combination of organic pigments as shown above, a combination of inorganic pig-ments as shown above, or a combination of organic and inorganic pigments as shown above, or may include a combination of a self-dispersing pigment and a pigment dispersion, which includes the pigment dispersed with the aid of the pigment dispersant in the water-soluble solvent as mentioned above. In particular, the pigment for the ink set according to this embodiment is preferably free of any self-dispersing pigment. In that case, the water-based ink can be effectively prevented from causing cissing. While the reason for this is not necessarily clear, a possible speculation is that in that case, the water-based ink can exhibit adequate wetting and spreading behavior to adequately penetrate into the substrate so that it can be effectively prevented from causing cissing.

Surfactant

The water-based ink according to this embodiment may contain a surfactant. For example, the surfactant is prefer-ably, but not limited to, an anionic surfactant, a nonionic surfactant, a silicone-based (silicon-based) surfactant, a fluorinated-based surfactant, or an acetylene glycol-based surfactant, which has a high ability to control surface tension. In particular, the water-based ink preferably con-tains a silicone-based surfactant and/or an acetylene glycol-based surfactant, more preferably a silicone surfactant. The water-based ink containing the organic solvent with a water-octanol partition coefficient of −0.3 or less and containing a silicone-based surfactant and/or an acetylene glycol-based surfactant can exhibit adequate wetting and spreading behavior when applied onto the pretreatment ink with an improved ability to penetrate, so that it can be more effec-tively prevented from causing filling defects and can form images with higher reproducibility.

Examples of the surfactant include EMAL, LATEMUL, PELEX, NEOPELEX, and DEMOL (all anionic surfactants manufactured by Kao Corporation), SUNNOL, LIPOLAN, LIPON, and LIPAL (all anionic surfactants manufactured by Lion Corporation), NOIGEN, EPAN, and SORGEN (all nonionic surfactants manufactured by DKS Co., Ltd.), EMULGEN, AMIET, and EMASOL (all nonionic surfac-tants manufactured by Kao Corporation), NAROACTY, EMULMIN, and SANNONIC (all nonionic surfactants manufactured by Sanyo Chemical Industries, Ltd.), SUR-FYNOL 104, 82, 420, 440, 465, 485, TG, 2502, SE-F, and 107L, and DYNOL 360, 604, and 607 (all acetylene glycol surfactants manufactured by Evonik Industries), DYNOL 960 (a blend of acetylene glycol and silicone surfactants, manufactured by Evonik Industries), SURFYNOL AD01 (alkane glycol surfactant manufactured by Evonik Indus-tries), OLFINE E1004, E1010, PD004, and EXP4300 (all acetylene glycol surfactants manufactured by Nissin Chemi-cal Co., Ltd.), MEGAFACE (fluorinated surfactant manu-factured by DIC Corporation), SURFLON (fluorinated sur-factant manufactured by AGC Seimi Chemical Co., Ltd.), BYK 302, 306, 307, 331, 333, 345, 346, 347, 348, 349, 3420, 3450, 3451, 3455, and 3456 (all silicone (silicon) surfactants manufactured by BYK-Chemie), KP-110, KP-112, KP-323, KP-341, and KP-6004 (all silicone (sili-con) surfactants manufactured by Shin-Etsu Chemical Co., Ltd.), TEGO FLOW 425, TEGO Glide 100, 110, 130, 410, 432, 440, 450, 482, 490, 492, 494, 496, ZG400, TEGO Twin 4000, TEGO Twin 4100, TEGO Twin 4200, TEGO Wet 240, TEGO Wet 250, and TEGO Wet 240, KL245, 250, 260, 265, 270, and 280 (all silicone (silicon) surfactants manufactured by Evonik Industries), and TEGO Wet 500, 505, 510, and 520 (all nonionic surfactants manufactured by Evonik Indus-tries).

The content of the surfactant in the water-based ink may be any level as long as the static surface tensions of the respective inks fall within specified ranges. The content of the surfactant in the water-based ink preferably has a lower limit of 0.30 mass % or more, more preferably 0.40 mass % or more, even more preferably 0.50 mass % or more, based on the total mass of the water-based ink. The content of the surfactant in the water-based ink preferably has an upper limit of 5.0 mass % or less, more preferably 4.0 mass % or less, even more preferably 3.0 mass % or less, based on the total mass of the water-based ink.

Other Components

If necessary, the water-based ink may further contain a conventionally known additive. Examples of such an additive include wax, a viscosity modifier, a pH adjuster, an antioxidant, a preservative, an antifungal agent, and so on.

Examples of the method for preparing the water-based ink include, but are not limited to, a method including adding the self-dispersing pigment, the resin, the surfactant, and optionally other components to the water-soluble solvent to form the water-based ink; a method including adding and dispersing the pigment and the dispersant into the water-soluble solvent and then adding the resin, the surfactant, and optionally other components to the dispersion to form the water-based ink; and a method including adding the pigment, the resin, the surfactant, and optionally other components to the water-soluble solvent and then dispersing the pigment to form the water-based ink.

The surface tension of the water-based ink may be any suitable level. The surface tension of the water-based ink preferably has an upper limit of 35.0 mN/m or less, more preferably 32.0 mN/m or less, even more preferably 30.0 mN/m or less. The surface tension of the water-based ink preferably has a lower limit of 21.5 mN/m or more, more preferably 22.5 mN/m or more, even more preferably 23.5 mN/m or more.

The surface tension of the water-based ink can be adjusted to fall within a specified range by controlling the type and content of the water-soluble solvent and the surfactant for the water-based ink.

Ink Set of First Embodiment

An embodiment of the present invention is directed to an ink set including the water-based ink described above and a pretreatment ink.

Hereinafter, the pretreatment ink for use in the ink set according to this embodiment will be described.

Pretreatment Ink

The pretreatment ink is a water-based ink that includes water and a reactant liquid including a cationic compound and is to be applied to a substrate in advance of the ejection of the water-based ink to the substrate. The pretreatment ink may be any type containing a reactant liquid including a cationic compound.

Reactant Liquid

The reactant liquid including a cationic compound can cause aggregation of colorant molecules in the water-based ink and prevent colorant molecules from spreading from the landing position to the surrounding and thus from causing bleeding. The cationic compound may be a cationic resin having a cationic group or may be a metal salt composed of a metal ion (cationic compound) and an anion. Among them, the cationic resin having a cationic group is preferably used. The cationic resin is more effective in preventing the bleeding of the water-based ink. The reason for this is not necessarily clear. The cationic resin has many reactive sites in its molecular chain, which can become entangled, and thus can have a higher ability to form aggregates with the colorant in the water-based ink. The cationic resin can also increase the ability of the pretreatment ink to penetrate. These features are considered to contribute to more effective prevention of the bleeding of the water-based ink.

The cationic resin may be a resin having an amino group, an ammonium group, an amide group, a —NHCONH$_2$ group, or any other cationic group. The cationic resin may be synthesized by known methods or obtained commercially.

The cationic resin may be synthesized by known methods or obtained commercially. Examples of the commercially available cationic resin include APC-810, APC-815, D-6010, D-6020, D-6030, D-6040, D-6050, D-6060, D-6080, D-6310, DEC-50, DEC-53, DEC-56, DEC-65, FL-14, FL-42, FL-44LF, FL-61, FL-2099, FL-2250, FL-2273, FL-2350, FL-2550, FL-2565, FL-2599, FL-2650, FL-2850, FL-2949, FL-3050, FL-3150, FL-4340, FL-4420, FL-4440, FL-4450, FL-4520, FL-4530, FL-4535, FL-4540, FL-4620, FL-4820, FQP-1264, RSL-18-22, RSL-4071H, RSL-4400, RSL-8391, RSL-8391H, RSL-HD70C, RSL-HF70D, and WS-72 (manufactured by SNF); Arafix 100, 251S, 255, and 255LOX (manufactured by Arakawa Chemical Industries, Ltd.); DK-6810, DK-6853, DK-6885, WS-4010, WS-4011, WS-4020, WS-4024, WS-4027, and WS-4030 (manufactured by Seiko PMC Corporation); Senka F-300, Papyogen P-105, P-113, P-271, and P-316, Pitchnol QG5A, Milliogen P-20, Unisense FPA 100L, FPA 101L, FPA 102L, FPA 1000L, FPA 1001L, FPA 100LU, FPA 102LU, and FPA 1000LU, Unisense FCA 1000L, FCA 1001L, FCA 1002L, FCA 1003L, and FCA 5000L, Unisense KCA 100L, KCA 100LU, KCA 1000LU, and KCA 1001LU, Unisense KHE 100L, KHE 101L, KHE 102L, E104L, KHE 105L, KHE 107L, KHE 1000L, and KHE 1001L, Unisense KHP 10P, KHP 11L, KHP 10LU, KHP 11LU, KHP 12LU, and KHP 20LU, Unisense KHF 10L and KHF 11L, Unisense FPV 1000L and FPV 1000LU, Unisense FCV 1000L, Unisense ZCA 1000L, ZCA 1001L, ZCA 1002L, and ZCA 5000L, and Unisense KPV 100LU and KPV 1000LU (manufactured by Senka Corporation); Pararock 410K101, 410K111, 420K308, 420K300, 460K313, 460K318, 470K308, 480K300, 490K300, 490K309, 500K30E, 500K40E, 59D, 920AP500, 975AP500, PD700, PD714L, PD714S, and P600, (manufactured by Asada Chemical Industry Co., Ltd.); Sumirez Resin 650 (30), 675A, 6615, and SLX-1 (manufactured by Taoka Chemical Co., Ltd.); EP-1137, MZ-477, MZ-480, NS-310X, and NS-625XC (manufactured by Takamatsu Oil & Fat Co., Ltd.); PAA-D11-HCL, D19-HCL, D41-HCL, D19A, PAA-HCL-03, PAA-HCL-05, PAA-HCL-3L, PAA-HCL-10L, PAA-1112CL, PAA-21CL, PAA-AC5050A, PAA-N5050CL, PAA-SA, PAS-A-1, PAS-A-5, PAS-H-1L, PAS-H-5L, PAS-H-10L, PAS-J-81, PAS-J-81L, PAS-M-1, PAS-M-1A, PAS-M-1L, PAS-21 PAS-21CL, PAS-22SA-40, PAS-24, PAS-92, PAS-92A, PAS-880, PAS-2201CL, and PAS-2401 (manufactured by Nittobo Medical Co., Ltd.); PP-17 (manufactured by Meisei Chemical Works, Ltd.); Catiomaster PD-1, PD-7, PD-30, PD-A, PDT-2, PE-10, PE-30, DT-EH, EPA-SK01, and TMHMDA-E (manufactured by Yokkaichi Chemical Co., Ltd.); and Jetfix 36N, 38A, and 5052 (manufactured by Satoda Chemical Industrial Co., Ltd.).

The cationic resin may be dissolved in the pretreatment ink or dispersed as resin fine particles in the pretreatment ink.

The metal salt may be a multivalent metal salt including a multivalent metal ion with a valence of at least two and an anion. Examples of the multivalent metal ion include calcium ion, magnesium ion, aluminum ion, titanium ion, iron (II) ion, iron (III) ion, cobalt ion, nickel ion, copper ion, zinc ion, barium ion, and strontium ion. In particular, the metal salt preferably contains at least one selected from the group consisting of calcium ion, magnesium ion, nickel ion, zinc ion, and aluminum ion so that it can significantly interact with the colorant in the ink composition to effectively prevent bleeding and unevenness.

The anion may be an inorganic anion or an organic anion. Examples of the organic anion include anions derived from acetic acid, benzoic acid, salicylic acid, 2,4-dihydroxybenzoic acid, 2,5-dihydroxybenzoic acid, dimethylolpropionic acid, pantothenic acid, succinic acid, maleic acid, glutaric acid, suberic acid, trimellitic acid, and methylmalonic acid. Examples of the inorganic anion include chloride ion, bromide ion, nitrate ion, and sulfate ion.

The content of the cationic compound in the pretreatment ink may be any suitable level. The content of the cationic compound in the pretreatment ink preferably has a lower limit of 0.5 mass % or more, more preferably 0.8 mass % or more, even more preferably 1.0 mass& or more, based on the total mass of the pretreatment ink. The pretreatment ink containing 0.5 mass % or more of the cationic compound based on its total mass can more effectively fix the colorant and more effectively prevent the bleeding of the water-based ink. The content of the cationic compound in the pretreatment ink preferably has an upper limit of 9 mass % or less, more preferably 8 mass % or less, even more preferably 7 mass % or less, based on the total mass of the pretreatment ink. The pretreatment ink containing 9 mass % or less of the cationic compound based on its total mass can have higher storage stability. In particular, when jetted onto the substrate surface by an inkjet method, the pretreatment ink containing 9 mass % or less of the cationic compound can have more stable jettability.

Resin

The pretreatment ink may contain a resin, which may be at least partially in the form of a resin emulsion. The term "resin emulsion" means an aqueous dispersion containing resin fine particles dispersed in a water-soluble solvent that forms a continuous phase. In the form of a resin emulsion, the resin can disperse as fine particles in the acceptor solution thanks to steric and electrostatic repulsive forces.

In the pretreatment ink, the resin is typically, but not limited to, a resin including at least one resin or copolymer resin selected from the group consisting of acrylic resin, styrene-acrylic resin, polyurethane resin, polyester resin, vinyl chloride resin, vinyl acetate resin, polyether resin, vinyl chloride-vinyl acetate copolymer resin, polyethylene resin, acrylamide resin, epoxy resin, polycarbonate resin, silicone resin, and polystyrene resin, or any mixture thereof.

The content of the resin in the pretreatment ink may be any suitable level. The content of the resin in the pretreatment ink preferably has a lower limit of 0.5 mass % or more, more preferably 0.8 mass % or more, even more preferably 1.0 mass % or more, based on the total mass of the pretreatment ink. The content of the resin in the pretreatment ink preferably has an upper limit of 20.0 mass % or less, more preferably 15.0 mass % or less, even more preferably 10.0 mass % or less, based on the total mass of the pretreatment ink.

Water

The pretreatment ink may contain water. The water is preferably deionized water or any other type of water free of various types of ions. The content of water in the pretreatment ink may be any suitable level that allows dispersion or dissolution of each component. The content of water in the pretreatment ink preferably has a lower limit of 30 mass % or more, more preferably 50 mass % or more, even more preferably 55 mass % or more, furthermore preferably 60 mass % or more, based on the total mass of the pretreatment ink. The content of water in the pretreatment ink preferably has an upper limit of 85 mass % or less, more preferably 82 mass % or less, even more preferably 80 mass % or less, based on the total mass of the pretreatment ink.

Organic Solvent

The pretreatment ink may contain an organic solvent. The organic solvent is capable of dispersing or dissolving the resin and other components. Since the pretreatment ink according to this embodiment contains water, the organic solvent preferably includes a water-soluble solvent.

Examples of the organic solvent include $C_1$ to $C_5$ alkyl alcohols, such as methyl alcohol, ethyl alcohol, n-propyl alcohol, isopropyl alcohol, n-butyl alcohol, sec-butyl alcohol, tert-butyl alcohol, isobutyl alcohol, and n-pentanol; amides, such as formamide, acetamide, propanamide, butanamide, isobutylamide, pentanamide, N-methylformamide, N-methylacetamide, N-methylpropanamide, N-methylbutanamide, N-methylisobutylamide, N-methylpentanamide, N-ethylformamide, N-ethylacetamide, N-ethylpropanamide, N-ethylbutanamide, N-ethylisobutylamide, N-ethylpentanamide, N-propylformamide, N-propylacetamide, N-propylpropanamide, N-propylbutanamide, N-propylisobutylamide, N-propylpentanamide, N-isopropylformamide, N-isopropylacetamide, N-isopropylpropanamide, N-isopropylbutanamide, N-isopropylisobutylamide, N-isopropylpentanamide, N-butylformamide, N-butylacetamide, N-butylpropanamide, N-butylbutanamide, N-butylisobutylamide, N-butylpentanamide, N,N-dimethylformamide, N,N-dimethylacetamide, N,N-dimethylpropanamide, N,N-dimethylbutanamide, N,N-dimethylisobutylamide, N,N-dimethylpentanamide, N,N-diethylformamide, N,N-diethylacetamide, N,N-diethylpropanamide, N,N-diethylbutanamide, N,N-diethylisobutylamide, N,N-diethylpentanamide, N,N-dipropylformamide, N,N-dipropylacetamide, N,N-dipropylpropanamide, N,N-dipropylbutanamide, N,N-dipropylisobutylamide, N,N-dipropylpentanamide, N,N-diisopropylformamide, N,N-diisopropylacetamide, N,N-diisopropylpropanamide, N,N-diisopropylbutanamide, N,N-diisopropylisobutylamide, N,N-diisopropylpentanamide, N,N-dibutylformamide, N,N-dibutylacetamide, N,N-dibutylpropanamide, N,N-dibutylbutanamide, N,N-dibutylisobutylamide, N,N-dibutylpentanamide, N-ethyl-N-methylformamide, N-ethyl-N-methylacetamide, N-ethyl-N-methylpropanamide, N-ethyl-N-methylbutanamide, N-ethyl-N-methylisobutylamide, N-ethyl-N-methylpentanamide, N-methyl-N-propylformamide, N-methyl-N-propylacetamide, N-methyl-N-propylpropanamide, N-methyl-N-propylbutanamide, N-methyl-N-propylisobutylamide, N-methyl-N-propylpentanamide, N-ethyl-N-propylformamide, N-ethyl-N-propylacetamide, N-ethyl-N-propylpropanamide, N-ethyl-N-propylbutanamide, N-ethyl-N-propylisobutylamide, and N-ethyl-N-propylpentanamide; ketones or keto alcohols, such as acetone and diacetone alcohol; ethers, such as tetrahydrofuran and dioxane; oxyethylene or oxypropylene copolymers, such as polyethylene glycol and polypropylene glycol; diols, such as ethylene glycol, propylene glycol, diethylene glycol, dipropylene glycol, 1,3-propanediol, isobutylene glycol, triethylene glycol, tripropylene glycol, tetraethylene glycol, 1,3-propanediol, 2-methyl-1,2-propanediol, 2-methyl-1,2-propanediol, 1,2-butanediol, 1,3-butanediol, 1,4-butanediol, 1,2-pentanediol, 1,2-hexanediol, 1,5-pentanediol, 1,6-hexanediol, 2-methyl-2,4-pentanediol, 3-methyl-1,3-butanediol, 3-methyl-1,5-pentanediol, and 2-methyl-2,4-pentanediol; triols, such as glycerol, trimethylolethane, trimethylolpropane, and 1,2,6-hexanetriol; tetrahydric alcohols, such as meso-erythritol and pentaerythritol; monoalkyl ethers, such as ethylene glycol monomethyl (or ethyl, isopropyl, n-butyl, isobutyl, n-hexyl, or 2-ethylhexyl) ether, diethylene glycol monomethyl (or ethyl, isopropyl, n-butyl, isobutyl, n-hexyl, or 2-ethylhexyl) ether, triethylene glycol monomethyl (or ethyl, propyl, isopropyl, n-butyl, isobutyl, tert-butyl, pentyl, n-hexyl, or 2-ethylhexyl) ether, propylene glycol monomethyl (or ethyl, propyl, isopropyl, n-butyl, isobutyl, tert-butyl, pentyl, n-hexyl, or 2-ethylhexyl) ether, dipropylene glycol monomethyl (or ethyl, propyl, isopropyl, n-butyl, isobutyl, tert-butyl, pentyl, n-hexyl, or 2-ethylhexyl) ether, and tripropylene glycol monomethyl (or ethyl, propyl, isopropyl, n-butyl, isobutyl, tert-butyl, pentyl, n-hexyl, or 2-ethylhexyl) ether; polyhydric alcohol dialkyl ethers, such as diethylene glycol dimethyl ether, diethylene glycol diethyl ether, diethylene glycol ethyl methyl ether, triethylene glycol dimethyl ether, triethylene glycol diethyl ether, triethylene glycol ethyl methyl ether, tetraethylene glycol dimethyl ether, tetraethylene glycol diethyl ether, tetraethylene glycol ethyl methyl ether, propylene glycol dimethyl ether, propylene glycol diethyl ether, propylene glycol ethyl methyl ether, dipropylene glycol dimethyl ether, dipropylene glycol diethyl ether, dipropylene glycol ethyl methyl ether, tripropylene glycol dimethyl ether, tripropylene glycol diethyl ether, and tripropylene glycol ethyl methyl ether; acetates, such as ethylene glycol monomethyl (or ethyl, propyl, isopropyl, n-butyl, isobutyl, tert-butyl, pentyl, n-hexyl, or 2-ethylhexyl) ether acetate, diethylene glycol monomethyl (or ethyl, propyl, isopropyl, n-butyl, isobutyl, tert-butyl, pentyl, n-hexyl, or 2-ethylhexyl) ether acetate, triethylene glycol monomethyl (or ethyl, propyl, isopropyl, n-butyl, isobutyl, tert-butyl, pentyl, n-hexyl, or 2-ethylhexyl) ether acetate, propylene glycol monomethyl (or ethyl, propyl, isopropyl, n-butyl, isobutyl, tert-butyl, pentyl, n-hexyl, or 2-ethylhexyl) ether acetate, dipropylene glycol monomethyl (or ethyl, propyl, isopropyl, n-butyl, isobutyl, tert-butyl, pentyl, n-hexyl, or 2-ethylhexyl) ether acetate, tripropylene glycol monomethyl (or ethyl, propyl, isopropyl, n-butyl, isobutyl, tert-butyl, pentyl, n-hexyl, or 2-ethylhexyl) ether acetate, ethylene glycol diacetate, diethylene glycol diacetate, propylene glycol diacetate, and dipropylene glycol diacetate; lactones, such as γ-butyrolactone, α-methylene-γ-butyrolactone, ε-caprolactone, γ-valerolactone, γ-hexanolactone, γ-heptalactone, δ-valerolactone, δ-hexanolactone, δ-heptalactone, δ-octalactone, δ-nonalactone, δ-decalactone, δ-undecalactone, γ,γ-dimethyl-γ-butyrolactone, α-methyl-γ-butyrolactone, γ-crotolactone, α-methylene-γ-butyrolactone, β-methyl-γ-butyrolactone, and 6-methylvalerolactone; carbonate esters, such as 2,3-butylene carbonate, ethylene carbonate, and propylene carbonate; oxazolidinone solvents, such as 3-methyl-2-oxazolidinone, 3-ethyl-2-oxazolidinone, and N-vinylmethyloxazolidinone; $C_1$ to $C_5$ alkyl alcohols, such as methyl alcohol, ethyl alcohol, n-propyl alcohol, isopropyl alcohol, n-butyl alcohol, sec-butyl alcohol, tert-butyl alcohol, isobutyl alcohol, and n-pentanol; monohydric alcohols, such as 3-methoxy-3-methyl-1-butanol, 3-methoxy-1-propanol, 1-methoxy-2-propanol, and 3-methoxy-n-butanol; ketones or keto alcohols, such as acetone and diacetone alcohol; ethers, such as tetrahydrofuran and dioxane; oxyethylene or oxypropylene copolymers, such as polyethylene glycol and polypropylene glycol; diols, such as ethylene glycol, propylene glycol, diethylene glycol, dipropylene glycol, 1,3-propanediol, isobutylene glycol, triethylene glycol, tripropylene glycol, tetraethylene glycol, 1,3-propanediol, 2-methyl-1,2-propanediol, 2-methyl-1,2-propanediol, 1,2-butanediol, 1,3-butanediol, 1,4-butanediol, 1,2-pentanediol, 1,2-hexanediol, 1,5-pentanediol, 1,6-hexanediol, 2-methyl-2,4-pentanediol, 3-methyl-1,3-butanediol, 3-methyl-1,5-pentanediol, and 2-methyl-2,4-pentanediol; triols, such as glycerol, trimethylolethane, trimethylolpropane, and 1,2,6-hexanetriol; tetrahydric alcohols, such as meso-erythritol and pentaerythritol; alkanolamines, such as monoethanolamine, diethanolamine, triethanolamine, N-methylethanolamine, N-ethylethanolamine, N-butylethanolamine, N-methyldiethanolamine, N-ethyldiethanolamine, and N-butyldiethanolamine; nitrogen-containing heterocyclic compounds, such as N-methyl-2-pyrrolidone, 2-pyrrolidone, and 1,3-dimethyl-2-imidazolidinone; cyclic compounds, such as γ-butyrolactone and sulfolane; morpholines, such as N-methylmorpholine, N-ethylmorpholine, and N-formylmorpholine; and terpene solvents.

In particular, the pretreatment ink preferably contains an organic solvent selected from the group consisting of an alkanediol and a monool. The pretreatment ink with this feature can have a reduced static surface tension $S_P$ and have an improved ability to penetrate. Thus, when applied to the pretreatment ink with this feature, the water-based ink can exhibit adequate wetting and spreading behavior and thus be effectively prevented from causing filling defects, so that it can form images with high reproducibility.

The term "alkanediol" refers to a polyhydric alcohol having two hydroxyl groups (OH groups). The term "monool" refers to a monohydric alcohol having a single hydroxyl group (OH group). The alkanediol is preferably a 1,2-alkanediol. The 1,2-alkanediol may be, for example, 1,2-propanediol, 1,2-butanediol, 1,2-pentanediol, 1,2-hexanediol, 4-methyl-1,2-pentanediol, or 3,3-dimethyl-1,2-butanediol. The monool may be, for example, methyl alcohol, ethyl alcohol, n-propyl alcohol, isopropyl alcohol, n-butyl alcohol, sec-butyl alcohol, tert-butyl alcohol, isobutyl alcohol, n-pentanol, 3-methoxy-3-methyl-1-butanol, 3-methoxy-1-propanol, 1-methoxy-2-propanol, or 3-methoxy-n-butanol.

The content of the organic solvent in the pretreatment ink may be any suitable level that allows dispersion or dissolution of each component. The content of the organic solvent in the pretreatment ink preferably has a lower limit of 5 mass % or more, more preferably 10 mass % or more, even more preferably 12 mass % or more, based on the total mass of the pretreatment ink. The content of the organic solvent in the pretreatment ink preferably has an upper limit of 50 mass % or less, more preferably 45 mass % or less, even more preferably 40 mass % or less, based on the total mass of the pretreatment ink.

Surfactant

The pretreatment ink may contain a surfactant. For example, the surfactant is preferably, but not limited to, a nonionic surfactant, a fluorinated surfactant, an acetylene glycol surfactant, or a silicone (silicon) surfactant.

Examples of the nonionic surfactant include NOIGEN, EPAN, and SORGEN (all manufactured by DKS Co., Ltd.), EMULGEN, AMIET, and EMASOL (all manufactured by Kao Corporation), and NAROACTY, EMULMIN, and SANNONIC (all manufactured by Sanyo Chemical Industries, Ltd.).

Examples of the fluorinated surfactant include MEGAFACE F-114, F-410, F-440, F-447, F-553, and F-556 (manufactured by DIC Corporation), and SURFLON S-211, S-221, S-231, S-233, S-241, S-242, S-243, S-420, S-661, S-651, and S-386 (manufactured by AGC Seimi Chemical Co., Ltd.).

Examples of the acetylene glycol surfactant include SURFYNOL 104, 82, 420, 440, 465, 485, TG, and 2502, and DYNOL 604, 607, and 960 (all acetylene glycol surfactants manufactured by Evonik Industries), OLFINE E1004, E1010, PD004, and EXP4300 (all acetylene glycol surfactants manufactured by Nissin Chemical Co., Ltd.), and ACETYLENOL EH, E40, E60, E81, E100, and E200 (all acetylene glycol surfactants manufactured by Kawaken Fine Chemicals Co., Ltd.).

Examples of the silicone (silicon) surfactant include FZ-2122, FZ-2110, FZ-7006, FZ-2166, FZ-2164, FZ-7001, FZ-2120, SH-8400, FZ-7002, FZ-2104, 8029 ADDITIVE, 8032 ADDITIVE, 57 ADDITIVE, 67 ADDITIVE, and 8616 ADDITIVE (all manufactured by Dow Toray Co., Ltd.), KF-6012, KF-6015, KF-6004, KF-6013, KF-6011, KF-6043, KP-104, KP-110, KP-112, KP-323, KP-341, and KP-6004 (all manufactured by Shin-Etsu Chemical Co., Ltd.), BYK-300, BYK-302, BYK-306, BYK-307, BYK-320, BYK-325, BYK-330, BYK-331, BYK-333, BYK-337, BYK-341, BYK-344, BYK-345, BYK-346, BYK-347, BYK-348, BYK-349, BYK-3420, BYK-3450, BYK-3451, BYK-3456, BYK-375, BYK-377, BYK-378, BYK-UV3500, BYK-UV3510, BYK-310, BYK-315, BYK-370, BYK-UV3570, BYK-322, BYK-323, BYK-350, BYK-352, BYK-354, BYK-355, BYK-358N, BYK-361N, BYK-380N, BYK-381, BYK-392, BYK-340, BYK-Silclean 3700, and BYK-Dynwet 800 (all manufactured by BYK-Chemie), SILFACE SAG002, SILFACE SAG005, SILFACE SAG008, SILFACE SAG014, SILFACE SAG503A, SIL-FACE SJM-002, and SILFACE SJM-003 (all manufactured by Nissin Chemical Co., Ltd.), and TEGO FLOW 425, TEGO Glide 100, 110, 130, 410, 432, 440, 450, 482, 490, 492, 494, 496, and ZG400, TEGO Twin 4000, TEGO Twin 4100, TEGO Wet 240, TEGO Wet 250, and TEGO Wet 240, KL245, 250, 260, 265, 270, and 280 (all manufactured by Evonik Industries).

An anionic surfactant may also be used. However, it is preferred to check whether the anionic surfactant to be used is compatible with the pretreatment ink containing a cationic compound.

If used, the anionic surfactant should be one compatible with the pretreatment ink, such as one selected from EMAL, LATEMUL, PELEX, NEOPELEX, and DEMOL (all manufactured by Kao Corporation), and SUNNOL, LIPOLAN, LIPON, and LIPAL (all manufactured by Lion Corporation).

The surfactants shown above may be used alone, or two or more of the surfactants shown above may be used in combination. The content of the surfactant in the pretreatment ink may be appropriately adjusted depending on its compatibility with the ink, cleaning performance, wettability on channel inner walls, and ink jettability.

The content of the surfactant in the pretreatment ink may be any suitable level. The content of the surfactant in the pretreatment ink preferably has a lower limit of 0.50 mass % or more, more preferably 0.60 mass % or more, even more preferably 0.70 mass % or more, based on the total mass of the pretreatment ink. The content of the surfactant in the pretreatment ink preferably has an upper limit of 5.0 mass % or less, more preferably 4.0 mass % or less, even more preferably 3.0 mass % or less, based on the total mass of the pretreatment ink.

Other Components

If necessary, the pretreatment ink may further contain a conventionally known additive. Examples of such an additive include a viscosity modifier, a pH adjuster, an antioxidant, a preservative, an antifungal agent, and so on.

The pretreatment ink may be prepared by any suitable method. For example, such a method includes adding the resin, the surfactant, and optionally other components to the water-soluble solvent to form the pretreatment ink.

The surface tension of the pretreatment ink may be any suitable level. The surface tension of the pretreatment ink preferably has an upper limit of 30.0 mN/m or less, more preferably 29.0 mN/m or less, even more preferably 28.0 mN/m or less. The surface tension of the pretreatment ink preferably has a lower limit of 20.0 mN/m or more, more preferably 21.0 mN/m or more, even more preferably 22.0 mN/m or more. In this regard, the surface tension is the value measured at a temperature of 25° C. by the Wilhelmy method (equipment: Model DY-300 manufactured by Kyowa Interface Science Co., Ltd.).

The surface tension of the pretreatment ink can be adjusted to fall within the specified range by controlling the type and content of the water-soluble solvent and the surfactant for the pretreatment ink. In the ink set, the water-based ink and the pretreatment ink preferably have static surface tensions $S_C$ and $S_P$, respectively, satisfying the relation shown below.

$$\text{The static surface tension } S_P \text{ of the pretreatment ink} < \text{the static surface tension } S_C \text{ of the water-based ink}$$

When this relation between the static surface tensions is satisfied, the water-based ink can be effectively prevented from bleeding. While the reason for this is not clear, one speculation is that after the water-based ink is landed on the surface of the pretreatment ink, the water-based ink can flow in such a direction as to contract itself (inward direction), which will control the wetting by and spreading of the water-based ink on the surface of the pretreatment ink to effectively prevent the bleeding of the water-based ink.

The water-based ink may be landed on a layer formed by solidifying or drying the pretreatment ink. Preferably, however, the water-based ink is ejected and landed on the pretreatment ink during the period when the pretreatment ink remains liquid (in a fluid state) after being landed on the substrate. The spreading of the water-based ink can be controlled even when the water-based ink is landed on the pretreatment ink remaining highly fluid on the substrate. Moreover, landing the water-based ink onto the pretreatment ink remaining highly fluid on the substrate will make it possible to perform higher speed printing and thus to increase the recorded matter production speed.

Regarding the static surface tensions of the respective inks, the lower limit of the difference $(S_C-S_P)$ between $S_C$ and $S_P$ is preferably, but not limited to, 0.5 mN/m or more, more preferably 0.7 mN/m or more, even more preferably 0.9 mN/m or more. With a difference $(S_C-S_P)$ between $S_C$ and $S_P$ of 0.5 mN/m or more, the water-based ink can be more effectively prevented from bleeding. While the reason for this is not necessarily clear, a possible speculation is that after the water-based ink is landed on the surface of the pretreatment ink, the water-based ink can flow in such a direction as to contract itself (inward direction) and thus can be more effectively prevented from bleeding.

The upper limit of the difference $(S_C-S_P)$ between $S_C$ and $S_P$ is preferably, but not limited to, 7.0 mN/m or less, more preferably 5.5 mN/m or less, even more preferably 3.0 mN/m or less. With a difference $(S_C-S_P)$ between $S_C$ and $S_P$ of 7.0 mN/m or less, the water-based ink can be effectively prevented from causing cissing. While the reason for this is not necessarily clear, a possible speculation is that with a difference $(S_C-S_P)$ between $S_C$ and $S_P$ of 7.0 mN/m or less, the water-based ink can exhibit adequate wetting and spreading behavior to adequately penetrate into the substrate.

Ink Set of Second Embodiment

An embodiment of the present invention is directed to an ink set including the pretreatment ink described above, the water-based ink described above, and an overcoat ink.

Hereinafter, the overcoat ink for use in the ink set according to this embodiment will be described.

Overcoat Ink

The overcoat ink is an ink for forming an overcoat layer on a surface of a recorded matter. The overcoat ink is a water-based ink including at least: a resin, an organic solvent, and water. Such a water-based overcoat ink has less impact on the environment and is non-flammable and highly safe for workers.

The phrase "an ink for forming an overcoat layer on a surface of a recorded matter" may refer to an ink for forming an overcoat layer directly on the surface of the water-based ink remaining fluid or may refer to an ink for forming an overcoat layer directly on the surface of a layer made from the water-based ink.

Next, each of the components of the overcoat ink according to this embodiment will be described.

Resin

The overcoat ink according to this embodiment contains a resin, which can form an overcoat layer having scratch resistance.

The resin for use in the overcoat ink is preferably selected based on the desired function of the overcoat layer. For example, to form an overcoat layer with sliding properties, the overcoat ink preferably contains (a) a resin having a glass transition temperature of 20° C. or more and/or (b) a styrene-acrylic resin having a glass transition temperature of 6° C. or more. For example, recorded matter each having the overcoat layer with sliding properties can be fed one by one at a high speed from a stack of recorded matter under a relatively high load.

As a non-limiting example, the resin (a) having a glass transition temperature of 20° C. or more may include at least one resin selected from the group consisting of acrylic resin, polyurethane resin, polyester resin, vinyl chloride resin, vinyl acetate resin, polyether resin, vinyl chloride-vinyl acetate copolymer resin, polyethylene resin, silicone (silicon) resin, acrylamide resin, epoxy resin, polycarbonate resin, and polystyrene resin, or may be any mixture of these resins. In particular, the resin preferably includes an acrylic resin having at least one monomer unit that forms an acrylic skeleton, a polyurethane resin having at least one monomer unit that forms a urethane skeleton, or a polyester resin having at least one monomer unit that forms an ester skeleton.

The styrene-acrylic resin (b) having a glass transition temperature of 6° C. or more may be a styrene-acrylic acid copolymer or a styrene-methacrylic acid copolymer.

The resin may be a commercially available product (resin emulsion), examples of which include, but are not limited to, NeoCryl A-2092 (styrene-acrylic resin with a Tg of 8° C.), NeoCryl A-639 (styrene-acrylic resin with a Tg of 62° C.), NeoCryl A-662 (styrene-acrylic resin with a Tg of 95° C.), NeoCryl A-2091 (styrene-acrylic resin with a Tg of 98° C.), QE-1042 (styrene-acrylic resin with a Tg of 53° C.), KE-1062 (styrene-acrylic resin with a Tg of 96° C.), TE-1048 (styrene-acrylic resin with a Tg of 123° C.), NeoCryl XK-190 (acrylic resin with a Tg of 80° C.), JONCRYL PDX-7630A (styrene-acrylic resin with a Tg of 53° C.), JONCRYL PDX-7696 (styrene-acrylic resin with a Tg of 86° C.), Carboset GA7439 (acrylic resin with a Tg of 31° C.), MW6899d (acrylic resin with a Tg of 48° C.), MW6969d (acrylic resin with a Tg of 73° C.), MW6810 (acrylic resin with a Tg of 110° C.), JE-1056 (acrylic resin with a Tg of 82° C.), TAKELAC W-6061 (urethane resin with a Tg of 73° C.), TAKELAC WS4022 (urethane resin with a Tg of 115° C.), SANCURE 815 (urethane resin with a Tg of 161° C.), SANCURE 777F (urethane resin with a Tg of 162° C.), Elitel KZT-8803 (polyester resin with a Tg of 61° C.), Elitel KZT-3556S (polyester resin with a Tg of 81° C.), JONCRYL PDX-7430 (acrylic-styrene resin with a Tg of 73° C.), JONCRYL PDX-7158 (acrylic-styrene resin with a Tg of 55° C.), JONCRYL PDX-7538 (acrylic-styrene resin with a Tg of 75° C.), NeoCryl A-2091 (styrene-acrylic resin with a Tg of 98° C.), VINYBLAN 700 (vinyl chloride-acrylic resin with a Tg of 73° C.), VINYBLAN 701 (vinyl chloride-acrylic resin with a Tg of 70° C.), and VINYBLAN 745 (vinyl chloride-acrylic resin with a Tg of 40° C.).

On the other hand, to form an overcoat layer with reduced sliding properties, the overcoat ink preferably contains a resin having a glass transition temperature of 10° C. or less. Recorded matters with reduced sliding properties can be each prevented from sliding out of a stack of the recorded matters due to, for example, vibration during transportation or storage.

As a non-limiting example, the resin having a glass transition temperature of 10° C. or less may include at least one resin selected from the group consisting of acrylic resin, polyurethane resin, polyester resin, vinyl chloride resin, vinyl acetate resin, polyether resin, vinyl chloride-vinyl acetate copolymer resin, polyethylene resin, silicone (silicon) resin, acrylamide resin, epoxy resin, polycarbonate resin, and polystyrene resin, or may be any mixture of these resins. In particular, the resin preferably includes an acrylic resin having at least one monomer unit that forms an acrylic skeleton and/or a polyurethane resin having at least one monomer unit that forms a urethane skeleton.

The resin may be a commercially available product (resin emulsion), examples of which include, but are not limited to, NeoCryl XK-190 (acrylic resin with a Tg of 0° C.), BON-RON PS-001 (acrylic resin with a Tg of 3° C.), NeoCryl A1125 (acrylic resin with a Tg of 13° C.), TAKELAC W-6110 (urethane resin with a Tg of –12° C.), Elitel KZT-9204 (polyester resin with a Tg of 19° C.), JONCRYL ECO 2124 (acrylic-styrene resin with a Tg of –35° C.), NE2260 (acrylic-styrene resin with a Tg of –10° C.), ACRIT UW-550CS (acrylic-styrene resin with a Tg of 4° C.), and J-140A (acrylic-styrene resin with a Tg of 5° C.).

In the overcoat ink according to this embodiment, the resin is preferably at least partially in the form of a resin emulsion. In the overcoat ink containing water according to this embodiment, such a resin emulsion can keep resin fine particles dispersed by electrostatic and steric repulsive forces. In particular, when jetted onto the recording surface by an inkjet method, the overcoat ink containing the resin at least partially in the form of a resin emulsion can have more stable jettability.

The resin emulsion preferably has an average particle size of 30 nm or more, more preferably 40 nm or more, even more preferably 50 nm or more. For high dispersion stability in the ink composition and for high jettability, the resin emulsion preferably has an average particle size of 300 nm or less, more preferably 270 nm or less, even more preferably 250 nm or less. In the overcoat ink, the resin emulsion with these features can have higher dispersion stability. In particular, when jetted onto the recording surface by an inkjet method, the overcoat ink containing the resin at least partially in the form of a resin emulsion can have more stable jettability. In this embodiment, the average particle size of the resin emulsion can be measured at a temperature of 25° C. using a fiber optics particle size analyzer (Model FPAR-1000 manufactured by Otsuka Electronics Co., Ltd.).

For formation of a water-resistant overcoat layer, the resin emulsion preferably has a mass average molecular weight of 10,000 or more, more preferably 50,000 or more, even more preferably 100,000 or more. For ink composition stability, the resin emulsion preferably has a mass average molecular weight of 1,000,000 or less, more preferably 700,000 or less, even more preferably 500,000 or less. In this embodiment, the molecular weight of the resin refers to the mass average molecular weight Mw, which is the value measured by GPC (gel permeation chromatography). The mass average molecular weight Mw may be determined using HLC-8120GPC manufactured by Tosoh Corporation and polystyrene standards for calibration curve.

The content of the resin in the overcoat ink may be any suitable level. The content of the resin in the overcoat ink preferably has a lower limit of 5 mass % or more, more preferably 8 mass % or more, even more preferably 10 mass % or more, based on the total mass of the overcoat ink. The overcoat ink with this feature can form an overcoat layer with higher scratch resistance. The content of the resin in the overcoat ink preferably has an upper limit of 30 mass % or less, more preferably 25 mass % or less, even more preferably 20 mass % or less, based on the total mass of the overcoat ink. This feature allows the resin to have higher dispersion stability. In particular, when jetted onto the recording surface by an inkjet method, the overcoat ink containing 30 mass % or less of the resin can have more stable jettability.

Water

The overcoat ink contains water as a main component. The water is preferably deionized water or any other type of water free of various types of ions. The content of water in the overcoat ink may be any suitable level that allows dispersion or dissolution of each component. The content of water in the overcoat ink preferably has a lower limit of 30 mass % or more, more preferably 40 mass % or more, even more preferably 45 mass % or more, furthermore preferably 50 mass % or more, based on the total mass of the overcoat ink. The content of water in the overcoat ink preferably has an upper limit of 85 mass % or less, more preferably 82 mass % or less, even more preferably 80 mass % or less, based on the total mass of the overcoat ink.

Organic Solvent

The overcoat ink according to this embodiment contains an organic solvent. The organic solvent is capable of dispersing or dissolving the resin and other components.

Since the overcoat ink according to this embodiment contains water, the organic solvent preferably includes a water-soluble solvent. As used herein, the term "water-soluble solvent" refers to a solvent capable of being dissolved in an amount of 5 parts by mass or more, preferably 20 parts by mass or more, more preferably 50 parts by mass or more, even more preferably 70 parts by mass or more, most preferably 90 parts by mass or more, in 100 parts by mass of water at 25° C. and 1 atm.

Examples of the organic solvent include $C_1$ to $C_5$ alkyl alcohols, such as methyl alcohol, ethyl alcohol, n-propyl alcohol, isopropyl alcohol, n-butyl alcohol, sec-butyl alcohol, tert-butyl alcohol, isobutyl alcohol, and n-pentanol; amides, such as formamide, acetamide, propanamide, butanamide, isobutylamide, pentanamide, N-methylformamide, N-methylacetamide, N-methylpropanamide, N-methylbutanamide, N-methylisobutylamide, N-methylpentanamide, N-ethylformamide, N-ethylacetamide, N-ethylpropanamide, N-ethylbutanamide, N-ethylisobutylamide, N-ethylpentanamide, N-propylformamide, N-propylacetamide, N-propylpropanamide, N-propylbutanamide, N-propylisobutylamide, N-propylpentanamide, N-isopropylformamide, N-isopropylacetamide, N-isopropylpropanamide, N-isopropylbutanamide, N-isopropylisobutylamide, N-isopropylpentanamide, N-butylformamide, N-butylacetamide, N-butylpropanamide, N-butylbutanamide, N-butylisobutylamide, N-butylpentanamide, N,N-dimethylformamide, N,N-dimethylacetamide, N,N-dimethylpropanamide, N,N-dimethylbutanamide, N,N-dimethylisobutylamide, N,N-dimethylpentanamide, N,N-diethylformamide, N,N-diethylacetamide, N,N-diethylpropanamide, N,N-diethylbutanamide, N,N-diethylisobutylamide, N,N-diethylpentanamide, N,N-dipropylformamide, N,N-dipropylacetamide, N,N-dipropylpropanamide, N,N-dipropylbutanamide, N,N-dipropylisobutylamide, N,N-dipropylpentanamide, N,N-diisopropylformamide, N,N-diisopropylacetamide, N,N-diisopropylpropanamide, N,N-diisopropylbutanamide, N,N-diisopropylisobutylamide, N,N-diisopropylpentanamide, N,N-dibutylformamide, N,N-dibutylacetamide, N,N-dibutylpropanamide, N,N-dibutylbutanamide, N,N-dibutylisobutylamide, N,N-dibutylpentanamide, N-ethyl-N-methylformamide, N-ethyl-N-methylacetamide, N-ethyl-N-methylpropanamide, N-ethyl-N-methylbutanamide, N-ethyl-N-methylisobutylamide, N-ethyl-N-methylpentanamide, N-methyl-N-propylformamide, N-methyl-N-propylacetamide, N-methyl-N-propylpropanamide, N-methyl-N-propylbutanamide, N-methyl-N-propylisobutylamide, N-methyl-N-propylpentanamide, N-ethyl-N-propylformamide, N-ethyl-N-propylacetamide, N-ethyl-N-propylpropanamide, N-ethyl-N-propylbutanamide, N-ethyl-N-propylisobutylamide, and N-ethyl-N-propylpentanamide; ketones or keto alcohols, such as acetone and diacetone alcohol; ethers, such as tetrahydrofuran and dioxane; oxyethylene or oxypropylene copolymers, such as polyethylene glycol and polypropylene glycol; diols, such as ethylene glycol, propylene glycol, diethylene glycol, dipropylene glycol, 1,3-propanediol, isobutylene glycol, triethylene glycol, tripropylene glycol, tetraethylene glycol, 1,3-propanediol, 2-methyl-1,2-propanediol, 2-methyl-1,2-propanediol, 1,2-butanediol, 1,3-butanediol, 1,4-butanediol, 1,2-pentanediol, 1,3-pentanediol, 1,2-hexanediol, 1,5-pentanediol, 1,6-hexanediol, 2-methyl-2,4-pentanediol, 3-methyl-1,3-butanediol, 3-methyl-1,5-pentanediol, and 2-methyl-2,4-pentanediol; triols, such as glycerol, trimethylolethane, trimethylolpropane, and 1,2,6-hexanetriol; tetrahydric alcohols, such as meso-erythritol and pentaerythritol; monoalkyl ethers, such as ethylene glycol monomethyl (or ethyl, isopropyl, n-butyl, isobutyl, n-hexyl, or 2-ethylhexyl) ether, diethylene glycol monomethyl (or ethyl, isopropyl, n-butyl, isobutyl, n-hexyl, or 2-ethylhexyl) ether, triethylene glycol monomethyl (or ethyl, propyl, isopropyl, n-butyl, isobutyl, tert-butyl, pentyl, n-hexyl, or 2-ethylhexyl) ether, propylene glycol monomethyl (or ethyl, propyl, isopropyl, n-butyl, isobutyl, tert-butyl, pentyl, n-hexyl, or 2-ethylhexyl) ether, dipropylene glycol monomethyl (or ethyl, propyl, isopropyl, n-butyl, isobutyl, tert-butyl, pentyl, n-hexyl, or 2-ethylhexyl) ether, and tripropylene glycol monomethyl (or ethyl, propyl, isopropyl, n-butyl, isobutyl, tert-butyl, pentyl, n-hexyl, or 2-ethylhexyl) ether; polyhydric alcohol dialkyl ethers, such as diethylene glycol dimethyl ether, diethylene glycol diethyl ether, diethylene glycol ethyl methyl ether, triethylene glycol dimethyl ether, triethylene glycol diethyl ether, triethylene glycol ethyl methyl ether, tetraethylene glycol dimethyl ether, tetraethylene glycol diethyl ether, tetraethylene glycol ethyl methyl ether, propylene glycol dimethyl ether, propylene glycol diethyl ether, propylene glycol ethyl methyl ether, dipropylene glycol dimethyl ether, dipropylene glycol diethyl ether, dipropylene glycol ethyl methyl ether, tripropylene glycol dimethyl ether, tripropylene glycol diethyl ether, and tripropylene glycol ethyl methyl ether; acetates, such as ethylene glycol monomethyl (or ethyl, propyl, isopropyl, n-butyl, isobutyl, tert-butyl, pentyl, n-hexyl, or 2-ethylhexyl) ether acetate, diethylene glycol monomethyl (or ethyl, propyl, isopropyl, n-butyl, isobutyl, tert-butyl, pentyl, n-hexyl, or 2-ethylhexyl) ether acetate, triethylene glycol monomethyl (or ethyl, propyl, isopropyl, n-butyl, isobutyl, tert-butyl, pentyl, n-hexyl, or 2-ethylhexyl) ether acetate, propylene glycol monomethyl (or ethyl, propyl, isopropyl, n-butyl, isobutyl, tert-butyl, pentyl, n-hexyl, or 2-ethylhexyl) ether acetate, dipropylene glycol monomethyl (or ethyl, propyl, isopropyl, n-butyl, isobutyl, tert-butyl, pentyl, n-hexyl, or 2-ethylhexyl) ether acetate, tripropylene glycol monomethyl (or ethyl, propyl, isopropyl, n-butyl, isobutyl, tert-butyl, pentyl, n-hexyl, or 2-ethylhexyl) ether acetate, ethylene glycol diacetate, diethylene glycol diacetate, propylene glycol diacetate, and dipropylene glycol diacetate; lactones, such as $\gamma$-butyrolactone, $\alpha$-methylene-$\gamma$-butyrolactone, $\epsilon$-caprolactone, $\gamma$-valerolactone, $\gamma$-hexanolactone, $\gamma$-heptalactone, $\delta$-valerolactone, $\delta$-hexanolactone, $\delta$-heptalactone, $\delta$-octalactone, $\delta$-nonalactone, $\delta$-decalactone, $\delta$-undecalactone, $\gamma,\gamma$-dimethyl-$\gamma$-butyrolactone, $\alpha$-methyl-$\gamma$-butyrolactone, $\gamma$-crotolactone, $\alpha$-methylene-$\gamma$-butyrolactone, $\beta$-methyl-$\gamma$-butyrolactone, and 6-methylvalerolactone; carbonate esters, such as 2,3-butylene carbonate, ethylene carbonate, and propylene carbonate; oxazolidinone solvents, such as 3-methyl-2-oxazolidinone, 3-ethyl-2-oxazolidinone, and N-vinylmethyloxazolidinone; $C_1$ to $C_5$ alkyl alcohols, such as methyl alcohol, ethyl alcohol, n-propyl alcohol, isopropyl alcohol, n-butyl alcohol, sec-butyl alcohol, tert-butyl alcohol, isobutyl alcohol, and n-pentanol; monohydric alcohols, such as 3-methoxy-3-methyl-1-butanol, 3-methoxy-1-propanol, 1-methoxy-2-propanol, and 3-methoxy-n-butanol; ketones or keto alcohols, such as acetone and diacetone alcohol; ethers, such as tetrahydrofuran and dioxane; oxyethylene or oxypropylene copolymers, such as polyethylene glycol and polypropylene glycol; diols, such as ethylene glycol, propylene glycol, diethylene glycol, dipropylene glycol, 1,3-propanediol, isobutylene glycol, triethylene glycol, tripropylene glycol, tetraethylene glycol, 1,3-propanediol, 2-methyl-1,2-propanediol, 2-methyl-1,2-propanediol, 1,2-butanediol, 1,3-butanediol, 1,4-butanediol, 1,2-pentanediol, 1,2-hexanediol, 1,5-pentanediol, 1,6-hexanediol, 2-methyl-2,4-pentanediol, 3-methyl-1,3-butanediol, 3-methyl-1,5-pentanediol, and 2-methyl-2,4-pentanediol; triols, such as glycerol, trimethylolethane, trimethylolpropane, and 1,2,6-hexanetriol; tetrahydric alcohols, such as meso-erythritol and pentaerythritol; alkanolamines, such as monoethanolamine, diethanolamine, triethanolamine, N-methylethanolamine, N-ethylethanolamine, N-butylethanolamine, N-methyldiethanolamine, N-ethyldiethanolamine, and N-butyldiethanolamine; nitrogen-containing heterocyclic compounds, such as N-methyl-2-pyrrolidone, 2-pyrrolidone, and 1,3-dimethyl-2-imidazolidinone; cyclic compounds, such as $\gamma$-butyrolactone and sulfolane; morpholines, such as N-methylmorpholine, N-ethylmorpholine, and N-formylmorpholine; and terpene solvents. In particular, the water-soluble solvent is preferably selected so as to allow the overcoat ink to have a suitable static surface tension satisfying the relation shown below. For example, the water-soluble solvent is preferably an alkanediol, such as propylene glycol.

The content of the organic solvent in the overcoat ink may be any suitable level that allows dispersion or dissolution of each component. The content of the organic solvent in the overcoat ink preferably has a lower limit of 5 mass % or more, more preferably 10 mass % or more, even more preferably 12 mass % or more, based on the total mass of the overcoat ink. The content of the water-soluble solvent in the overcoat ink preferably has an upper limit of 50 mass % or less, more preferably 45 mass % or less, even more preferably 40 mass % or less, based on the total mass of the overcoat ink.

Wax

The overcoat ink may contain wax. The wax may be an organic material or silicone compound that is solid at room temperature or lower and will liquefy when heated. The overcoat ink containing wax in addition to the resin having the specified glass transition temperature can form an overcoat layer with higher scratch resistance.

In particular, the overcoat ink containing wax in addition to the resin (a) having a glass transition temperature of 20° C. or more and/or the styrene-acrylic resin (b) having a glass transition temperature of 6° C. or more (for imparting sliding properties) can form an overcoat layer with highly improved sliding properties.

Examples of the wax include low-molecular-weight polyolefin waxes, such as polyethylene wax, polypropylene wax, polybutene wax, polyethylene-blend wax, polypropylene wax, and polypropylene-blend wax, silicone (silicon) waxes with softening points, silicone (silicon)-acrylic waxes, fatty acid amides, such as oleic acid amide, erucic acid amide, ricinoleic acid amide, and stearic acid amide, plant waxes, such as ester wax, carnauba wax, rice wax, candelilla wax, wood wax, and jojoba oil, animal waxes, such as beeswax, lanolin, and whale wax, mineral waxes, such as montan wax, ozokerite, ceresin, and Fischer-Tropsch wax, petroleum waxes, such as paraffin wax, microcrystalline wax, petrolatum, and paraffin blend wax, and modifications thereof. These waxes are readily available commercially. These waxes also include what are called lubricants or slip agents. In particular, polyethylene wax or silicone surfactant wax is preferably used. Examples of such polyethylene wax and silicone surfactant wax include AQUACER 515 and 531 (polyethylene wax emulsions manufactured by BYK-Chemie), NOPCOAT PEM-17 (polyethylene wax emulsion manufactured by San Nopco Limited), TEGO Glide 410, 440, 450, 482, 485, and 496 (silicone surfactants manufactured by Evonik Industries), and SILFACE SAG005 and SILFACE SAG008 (silicone surfactants manufactured by Nissin Chemical Co., Ltd.). The overcoat ink according to this embodiment may contain one of these waxes or a combination of two or more of these waxes.

The content of the wax, if any, in the overcoat ink preferably has a lower limit of 0.05 mass % or more, more preferably 0.10 mass % or more, even more preferably 0.15 mass % or more, based on the total mass of the overcoat ink. The wax content preferably has an upper limit of 5.0 mass % or less, more preferably 3.0 mass % or less, even more preferably 2.0 mass % or less, based on the total mass of the overcoat ink. The overcoat ink with these features can contain the wax with higher dispersibility and can have more stable jettability particularly when jetted onto the recording surface by an inkjet method.

Surfactant

The overcoat ink according to this embodiment may contain a surfactant. The overcoat ink containing a surfactant can have a surface tension controlled to fall within an appropriate range. The surfactant is preferably, but not limited to, an anionic surfactant, a nonionic surfactant, a silicone (silicon) surfactant, a fluorinated surfactant, or an acetylene glycol surfactant, which has a high ability to control surface tension. In particular, the surfactant preferably includes a silicone (silicon) surfactant or an acetylene glycol surfactant. The surfactant allows the overcoat ink to have a surface tension falling within a range satisfying, for example, the relation shown below (the static surface tension $S_O$ of the overcoat ink≤the static surface tension of the pretreatment ink $S_P$<the static surface tension of the water-based ink $S_C$).

Examples of the surfactant include EMAL, LATEMUL, PELEX, NEOPELEX, and DEMOL (all anionic surfactants manufactured by Kao Corporation), SUNNOL, LIPOLAN, LIPON, and LIPAL (all anionic surfactants manufactured by Lion Corporation), NOIGEN, EPAN, and SORGEN (all nonionic surfactants manufactured by DKS Co., Ltd.), EMULGEN, AMIET, and EMASOL (all nonionic surfactants manufactured by Kao Corporation), NAROACTY, EMULMIN, and SANNONIC (all nonionic surfactants manufactured by Sanyo Chemical Industries, Ltd.), SUR-FYNOL 104, 82, 420, 440, 465, 485, TG, 2502, SE-F, and 107L, and DYNOL 360, 604, and 607 (all acetylene glycol surfactants manufactured by Evonik Industries), DYNOL 960 (a blend of acetylene glycol and silicone surfactants, manufactured by Evonik Industries), SURFYNOL AD01 (alkane glycol surfactant manufactured by Evonik Industries), OLFINE E1004, E1010, PD004, and EXP4300 (all acetylene glycol surfactants manufactured by Nissin Chemical Co., Ltd.), MEGAFACE (fluorinated surfactant manufactured by DIC Corporation), SURFLON (fluorinated surfactant manufactured by AGC Seimi Chemical Co., Ltd.), BYK 302, 306, 307, 331, 333, 345, 346, 347, 348, 349, 3420, 3450, 3451, 3455, and 3456 (all silicone (silicon) surfactants manufactured by BYK-Chemie), KP-110, KP-112, KP-323, KP-341, and KP-6004 (all silicone (silicon) surfactants manufactured by Shin-Etsu Chemical Co., Ltd.), SILFACE SAG002, SILFACE SAG005, SILFACE SAG008, SILFACE SAG014, SILFACE SAG503A, SIL-FACE SJG-002, SILFACE SJM-002, and SILFACE SJM-003 (all silicone (silicon) surfactants manufactured by Nissin Chemical Co., Ltd.), TEGO FLOW 425, TEGO Glide 100, 110, 130, 410, 432, 440, 450, 482, 490, 492, 494, 496, ZG400, TEGO Twin 4000, TEGO Twin 4100, TEGO Twin 4200, TEGO Wet 240, TEGO Wet 250, and TEGO Wet 240, KL245, 250, 260, 265, 270, and 280 (all silicone (silicon) surfactants manufactured by Evonik Industries), and TEGO Wet 500, 505, 510, and 520 (all nonionic surfactants manufactured by Evonik Industries).

The content of the surfactant in the overcoat ink may be any suitable level. The content of the surfactant in the overcoat ink preferably has a lower limit of 0.5 mass % or more, more preferably 0.8 mass % or more, even more preferably 1.0 mass % or more, based on the total mass of the overcoat ink. The content of the surfactant in the overcoat ink preferably has an upper limit of 5.0 mass % or less, more preferably 4.5 mass % or less, even more preferably 4.0 mass % or less, based on the total mass of the overcoat ink. The overcoat ink with a surfactant content falling within such a range can contain the resin and wax with higher dispersibility and can have more stable jettability particularly when jetted onto the recording surface by an inkjet method.

Antimicrobial Agent

The overcoat ink according to this embodiment may contain an antimicrobial agent. The antimicrobial agent may be an inorganic antimicrobial agent or a water-soluble organic antimicrobial agent. The antimicrobial agent may be one that is effective in killing familiar microorganisms, such as bacteria including *Staphylococcus aureus* and *Escherichia coli*, fungi including molds and yeasts, and viruses.

Examples of the organic antimicrobial agent include phenol ether derivatives, imidazole derivatives, sulfone derivatives, N-haloalkylthio compounds, anilide derivatives, pyrrole derivatives, quaternary ammonium salts, pyridines, triazines, benzisothiazoline, and isothiazolones.

Examples include, but are not limited to, 1,2-benzisothi-azolin-3-one, N-fluorodichloromethylthio-phthalimide, 2,3, 5,6-tetrachloroisophthalonitrile, 2,4,5,6-tetrachloroisoph-thalonitrile (hereinafter also referred to as "TPN"), N-trichloromethylthio-4-cyclohexene-1,2-dicarboxyimide, copper 8-quinolinolate, bis(tributyltin)oxide, 2-(4-thiazolyl) benzimidazole (hereinafter also referred to as "TBZ"), methyl 2-benzimidazolecarbamate (hereinafter also referred to as "BCM"), 10,10'-oxybisphenoxarsine (hereinafter also referred to as "OBPA"), 2,3,5,6-tetrachloro-4-(methyl-sulfone)pyridine, bis(2-pyridylthio-1-oxide)zinc (hereinafter also referred to as "ZPT"), N,N-dimethyl-N'-(fluorodi-chloromethylthio)-N'-phenylsulfamide(dichlofluanid), poly (hexamethylene biguanide)hydrochloride, dithio-2,2'-bis (benzmethylamide), 2-methyl-4,5-trimethylene-4-isothiazolin-3-one, 2-bromo-2-nitro-1,3-propanediol, hexahydro-1,3-tris-(2-hydroxyethyl)-S-triazine, p-chloro-m-xylenol, and 1,2-benzisothiazolin-3-one.

Examples of the inorganic antimicrobial agent include, in order of decreasing antimicrobial activity, mercury, silver, copper, zinc, iron, lead, and bismuth. For example, the inorganic antimicrobial agent may include a support, such as a silicate support, a phosphate support, an oxide, glass, potassium titanate, or amino acid; and a metal or metal ions, such as silver, copper, zinc, or nickel, supported on the support. Examples of the inorganic antimicrobial agent include, but are not limited to, zeolite-based antimicrobial agents, calcium silicate-based antimicrobial agents, zirconium phosphate-based antimicrobial agents, calcium phosphate-based antimicrobial agents, zinc oxide-based antimicrobial agents, soluble glass-based antimicrobial agents, silica gel-based antimicrobial agents, activated carbon-based antimicrobial agents, titanium oxide-based antimicrobial agents, titania-based antimicrobial agents, organometallic antimicrobial agents, ion exchanger ceramic-based antimicrobial agents, layered phosphate-quaternary ammonium salt-based antimicrobial agents, and antimicrobial stainless steel.

Infrared Absorber

The overcoat ink according to this embodiment may contain an infrared absorber. The infrared absorber may be any material having the property of effectively absorbing light with wavelengths in the infrared region, especially in the near-infrared region. Both inorganic and organic infrared absorbers may be used.

The inorganic infrared absorber may be, for example, at least one selected from the group consisting of titanium dioxide, zinc oxide, indium oxide, tin-doped indium oxide (ITO), tin oxide, antimony-doped tin oxide (ATO), and zinc sulfide.

Examples of the organic infrared absorber include cyanine compounds, squarylium compounds, thiol-nickel complex compounds, naphthalocyanine compounds, phthalocyanine compounds, triarylmethane compounds, naphthoquinone compounds, anthraquinone compounds, amino compounds, such as N,N,N',N'-tetrakis(p-di-n-buty-laminophenyl)-p-phenylenediaminium perchlorate, phe-nylenediaminium chlorate, phenylenediaminium hexafluo-roantimonate, phenylenediaminium fluoroborate, phenylenediaminium fluorate, and phenylenediaminium perchlorate, a product of reaction between a copper compound and a bisthiourea compound, and copper phosphate compounds resulting from reaction between phosphorus compounds and copper compounds or between phosphoric ester compounds and copper compounds.

Ultraviolet Absorber

The overcoat ink according to this embodiment may contain an ultraviolet absorber. The overcoat ink containing an ultraviolet absorber can form an overcoat layer with improved lightfastness. The ultraviolet absorber may be a known UV absorber, such as a benzotriazole compound, a benzophenone compound, a triazine compound, or a benzoxazole compound.

Light Stabilizer

The overcoat ink according to this embodiment may contain a light stabilizer. The overcoat ink containing a light stabilizer can form an overcoat layer with improved lightfastness. The light stabilizer may be a hindered amine light stabilizer (HALS), which is known in the art.

Antioxidant

The overcoat ink according to this embodiment may contain an antioxidant. The overcoat ink containing an antioxidant can form an overcoat layer with improved lightfastness. The antioxidant may be one known in the art, such as a hindered phenol or any other phenolic antioxidant, a chromane compound, a chraman compound, a hydroquinone derivative, a benzotriazole compound (with no ability to absorb UV), or a spiroindane compound. The antioxidant may also be an epoxy compound or a polyvalent carboxylic acid compound.

Other Components

If necessary, the overcoat ink may further contain a conventionally known additive. Examples of such an additive include a colorant, a viscosity modifier, a pH adjuster, a preservative, an antifungal agent, and so on.

The overcoat ink according to this embodiment may contain a colorant. Preferably, the overcoat ink should not contain much colorant. The overcoat not containing much colorant can make the recording surface clearly visible. Specifically, the content of the colorant in the overcoat ink is preferably 3.0 mass % or less, more preferably 1.0 mass % or less, even more preferably 0.5 mass % or less, furthermore preferably 0.1 mass % or less, most preferably zero mass % (colorant-free), based on the total mass of the overcoat ink.

The overcoat ink may contain a white pigment to form a white overcoat layer. The overcoat ink may contain a glittering pigment to form a metallic overcoat layer. In those cases, the pigment content of the overcoat ink preferably has a lower limit of 0.05 mass % or more, more preferably 0.08 mass % or more, even more preferably 0.1 mass % or more, based on the total mass of the overcoat ink. The pigment content of the overcoat ink preferably has an upper limit of 20 mass % or less, more preferably 15 mass % or less, even more preferably 10 mass % or less, based on the total mass of the overcoat ink. Examples of the white pigment include barium sulfate, barium carbonate, barium sulfate, silica, clay, talc, titanium oxide, calcium carbonate, synthetic mica, alumina, and other inorganic pigments. Examples of the glittering pigment include pearl pigments with pearlescence or interference gloss, such as mica, titanium dioxide-coated mica, argentine, bismuth oxychloride, silicon dioxide, metal oxides, and laminations thereof; elementary metals, such as aluminum, silver, gold, nickel, chromium, tin, zinc, indium, titanium, and copper; metal compounds; and at least one of alloys or mixtures thereof or other metal-containing glittering pigments.

The overcoat ink may be prepared by any suitable method. For example, such a method includes adding the resin, the surfactant, and optionally other components to the water-soluble solvent to form the overcoat ink.

The surface tension of the overcoat ink may be any suitable level. The surface tension of the overcoat ink preferably has an upper limit of 30.0 mN/m or less, more preferably 29.0 mN/m or less, even more preferably 28.0 mN/m or less. The surface tension of the overcoat ink preferably has a lower limit of 19.0 mN/m or more, more preferably 20.0 mN/m or more, even more preferably 21.0 mN/m or more. In this regard, the static surface tension is the value measured at a temperature of 25° C. by the Wilhelmy method (equipment: Model DY-300 manufactured by Kyowa Interface Science Co., Ltd.).

The surface tension of the overcoat ink can be adjusted to fall within the specified range by controlling the type and content of the organic solvent and the surfactant for the overcoat ink. In the ink set, the overcoat ink, the water-based ink, and the pretreatment ink preferably have static surface tensions $S_O$, $S_C$, and $S_P$, respectively, satisfying the relation below.

The static surface tension $S_O$ of the overcoat ink≤the static surface tension $S_P$ of the pretreatment ink<the static surface tension $S_C$ of the water-based ink When this relation between the static surface tensions is satisfied, the water-based ink can be effectively prevented from bleeding. While the reason for this is not clear, one speculation is that after the water-based ink is landed on the surface of the pretreatment ink, the water-based ink can flow in such a direction as to contract itself (inward direction), which will control the wetting by and spreading of the water-based ink on the surface of the pretreatment ink to effectively prevent the bleeding of the water-based ink. Another speculation is that the overcoat ink can flow in such a direction as to spread itself (outward direction) at the interface between it and the mixture (the mixture of the pretreatment ink and the water-based ink) while the mixture (the mixture of the pretreatment ink and the water-based ink) can flow in such a direction as to contract itself (inward direction), which will control the wetting by and spreading of the water-based ink to effectively prevent the bleeding of the water-based ink.

The overcoat ink may be landed on a layer formed by solidifying or drying the water-based ink. Preferably, however, the overcoat ink is ejected and landed on the substrate during the period when the mixture of the water-based ink and the pretreatment ink remains liquid (in a fluid state) after they are landed on the substrate. The spreading of the water-based ink can be prevented even when the overcoat ink is landed on the mixture of the water-based ink and the pretreatment ink remaining highly fluid on the substrate. Moreover, landing the overcoat ink onto the mixture of the water-based ink and the pretreatment ink remaining highly fluid on the substrate will make it possible to perform higher speed printing and thus to increase the recorded matter production speed.

Regarding the static surface tension of each ink, the lower limit of the difference between $S_C$ and $S_P$ ($S_C$–$S_P$) is preferably, but not to, 0.5 mN/m or more, more preferably 0.7 mN/m or more, even more preferably 0.9 mN/m or more. With a difference ($S_C$–$S_P$) between $S_C$ and $S_P$ of 0.5 mN/m or more, the water-based ink can be effectively prevented from bleeding. While the reason for this is not clear, one speculation is that after the water-based ink is landed on the surface of the pretreatment ink, the water-based ink can flow in such a direction as to contract itself (inward direction), which will effectively prevent the bleeding of the water-based ink.

The upper limit of the difference ($S_C$–$S_P$) between $S_C$ and $S_P$ is preferably, but not limited to, 7.0 mN/m or less, more preferably 5.5 mN/m or less, even more preferably 3.0 mN/m or less. With a difference ($S_C$–$S_P$) between $S_C$ and $S_P$ of 7.0 mN/m or less, the water-based ink can be effectively prevented from causing cissing. While the reason for this is not necessarily clear, a possible speculation is that with a difference ($S_C$–$S_P$) between $S_C$ and $S_P$ of 7.0 mN/m or less, the water-based ink can exhibit adequate wetting and spreading behavior to adequately fill into the substrate.

The lower limit of the difference ($S_P$–$S_O$) between $S_P$ and $S_O$ is preferably, but not limited to, 0 mN/m or more, more preferably 0.2 mN/m or more, even more preferably 0.4 mN/m or more. With a difference ($S_P$–$S_O$) between $S_P$ and $S_O$ of 0 mN/m or more, the water-based ink can be prevented from bleeding. While the reason for this is not necessarily clear, a possible speculation is that when the difference ($S_P$–$S_O$) between $S_P$ and $S_O$ is 0 mN/m or more, the mixture (the mixture of the pretreatment ink and the water-based ink) can flow in such a direction as to contract itself (inward direction) against the overcoat ink so that the water-based ink can be prevented from bleeding.

The upper limit of the difference ($S_P$–$S_O$) between $S_P$ and $S_O$ is preferably, but not limited to, 3.5 mN/m or less, more preferably 3.0 mN/m or less, even more preferably 2.7 mN/m or less. With a difference ($S_P$–$S_O$) between $S_P$ and $S_O$ of 3.5 mN/m or less, the water-based ink can be more effectively prevented from bleeding. The reason for this is not necessarily clear. If the difference ($S_P$–$S_O$) between $S_P$ and $S_O$ is too large, the overcoat ink may exhibit excessive wetting and spreading behavior, which the mixture (the mixture of the pretreatment ink and the water-based ink) may physically follow to exhibit wetting and spreading behavior, so that the bleeding of the water-based ink will tend to be relatively significant. A possible speculation is that with a difference ($S_P$–$S_O$) between $S_P$ and $S_O$ of 3.5 mN/m or less, the overcoat ink can be prevented from exhibiting significant wetting and spreading behavior, which will lead to more effective prevention of the bleeding of the water-based ink.

The lower limit of the difference ($S_C$–$S_O$) between $S_C$ and $S_O$ is preferably, but not limited to, 0.6 mN/m or more, more preferably 0.8 mN/m or more, even more preferably 0.9 mN/m or more. With a difference ($S_C$–$S_O$) between $S_C$ and $S_O$ of 0.6 mN/m or more, the water-based ink can be more effectively prevented from bleeding. While the reason for this is not necessarily clear, a possible speculation is that when the difference ($S_C$–$S_O$) between $S_C$ and $S_O$ is 0.6 mN/m or more, the mixture (the mixture of the pretreatment ink and the water-based ink) can flow in such a direction as to contract itself (inward direction) against the overcoat ink so that the water-based ink can be prevented from bleeding.

The upper limit of the difference ($S_C$–$S_O$) between $S_C$ and $S_O$ is preferably, but not limited to, 7.5 mN/m or less, more preferably 6.0 mN/m or less, even more preferably 4.5 mN/m or less. With a difference ($S_C$–$S_O$) between $S_C$ and $S_O$ of 7.5 mN/m or less, the water-based ink can be more effectively prevented from bleeding. The reason for this is not necessarily clear. If the difference ($S_C$–$S_O$) between $S_C$ and $S_O$ is too large, the overcoat ink may exhibit excessive wetting and spreading behavior, which the mixture (the mixture of the pretreatment ink and the water-based ink) may physically follow to exhibit wetting and spreading behavior, so that the bleeding of the water-based ink will tend to be relatively significant. A possible speculation is that with a difference ($S_C$–$S_O$) between $S_C$ and $S_O$ of 7.5 mN/m or less, the overcoat ink can be prevented from exhibiting significant wetting and spreading behavior, which will lead to more effective prevention of the bleeding of the water-based ink.

Recording Method

An embodiment of the present invention is directed to an inkjet recording method using the ink set including the pretreatment ink, the water-based ink, and the overcoat ink described above. The inkjet recording method includes jetting each of the inks of the ink set onto a substrate.

The water-based ink contains the organic solvent having a water-octanol partition coefficient of −0.3 or less. The water-based ink with this feature has a reduced ability to penetrate into the substrate (recording medium) and can form images with high reproducibility while being effectively prevented from causing a local reduction in print density or filling defects.

The recording method according to this embodiment may be a scanning inkjet recording method that includes performing printing over a substrate (recording medium) using an inkjet head that reciprocates in synchronization with the substrate and moves in a direction perpendicular to the substrate feed direction or may be a single-pass inkjet recording method that includes passing a substrate once under an inkjet head to form an image. In particular, when the inks of the ink set have static surface tensions $S_O$, $S_P$, and $S_C$ adjusted to satisfy, for example, the relation $S_O{\leq}S_P{<}S_C$, the recording method is preferably a single-pass inkjet recording method. In the single-pass inkjet recording method, which enables relatively high speed printing, the time taken for each ink to land on the substrate is relatively short and thus there is a relatively high risk of causing the water-based ink to spread from the landing position to the surrounding and to bleed. However, when the inks of the ink set have static surface tensions $S_O$, $S_P$, and $S_C$ adjusted to satisfy the relation $S_O{\leq}S_P{<}S_C$, the ink set can be advantageously used for the single-pass inkjet recording method, such as line head printing, to achieve high-speed printing without the above problem with the single-pass inkjet recording method.

FIG. 1 shows a device 1 for ejecting the ink set onto a substrate, which is suitable for use in the recording method according to this embodiment. The device 1 includes a pretreatment ink ejection unit 21 that ejects the pretreatment ink 11; a water-based ink ejection unit 22 that ejects the water-based ink 12; and an overcoat ink ejection unit 23 that ejects the overcoat ink 13, in which the pretreatment ink ejection unit 21, the water-based ink ejection unit 22, and the overcoat ink ejection unit 23 are arranged in order along a direction in which a substrate (recording medium) is to be fed. The device 1 is characterized in that it has no drying mechanism between the pretreatment ink ejection unit 21 and the water-based ink ejection unit 22 and no drying mechanism between the water-based ink ejection unit 22 and the overcoat ink ejection unit 23.

When the inks of the ink set have static surface tensions $S_O$, $S_P$, and $S_C$ adjusted to fall within specific ranges satisfying the relation $S_O{\leq}S_P{<}S_C$, the water-based ink can be effectively prevented from bleeding even in a high-speed, single-pass printing process using the device 1 shown in FIG. 1, which has no drying mechanism between each set of the adjacent ejection units so that no drying process is performed until all the inks of the ink set are ejected onto the substrate.

The recording method according to this embodiment has been described with reference to an inkjet recording method using the ink set of the second embodiment including the pretreatment ink, the water-based ink, and the overcoat ink.

It should be noted that the water-based ink can also be effectively prevented from bleeding in the recording method using the ink set of the first embodiment including the pretreatment ink and the water-based ink satisfying the relation $S_P<S_C$.

The printing may also be performed using a device having a drying mechanism between each set of the adjacent ejection units. However, the device with no drying mechanism between each set of the adjacent ejection units can be made compact and have a feed unit with a short entire length to achieve high-speed printing with the water-based ink being effectively prevented from bleeding.

When the inks of the ink set have static surface tensions $S_O$, $S_P$, $S_C$ adjusted to fall within specific ranges satisfying the relation $S_O \leq S_P<S_C$, the recording speed (substrate transport speed) in the recording method according to this embodiment is preferably 30 m/min or more, more preferably 40 m/min or more, even more preferably 50 m/min or more. The water-based ink can be effectively prevented from bleeding even when each of the inks of the ink set is jetted onto the substrate (recording medium) being fed at such a high rate.

The recording method preferably further includes drying each of the inks of the ink set after the ejection of the ink. The drying can effectively remove volatile components from each ink and thus more effectively prevent the water-based ink from bleeding.

A method for drying each ink may include drying with a heater facing the bottom side of the substrate (opposite to the side onto which the ink is ejected) or blowing warm air over the recorded matter. In this regard, after being ejected, the ink may not be intentionally dried, namely, may be subjected to natural drying.

Recorded Matter Production Method

An embodiment of the present invention is directed to a recorded matter production method using the ink set including the pretreatment ink, the water-based ink, and the overcoat ink described above. The recorded matter production method includes jetting each of the inks of the ink set onto a substrate.

The water-based ink contains the organic solvent having a water-octanol partition coefficient of −0.3 or less. The water-based ink with this feature has a reduced ability to penetrate into the substrate (recording medium) and can form images with high reproducibility while being effectively prevented from causing a local reduction in print density or filling defects.

When the inks of the ink set have static surface tensions $S_O$, $S_P$, and $S_C$ adjusted to fall within specific ranges satisfying the relation $S_O \leq S_P<S_C$, the ink set can produce recorded matters with high sliding properties while the water-based ink is effectively prevented from bleeding even in a high-speed, single-pass printing process using the device 1 shown in FIG. 1, which has no drying mechanism between each set of the adjacent ejection units.

The recorded matter production method preferably further includes drying each of the inks of the ink set after the ejection of the ink. The drying can effectively remove volatile components from each ink and thus more effectively prevent the water-based ink from bleeding. Each ink may be dried using the method described above for the recording method.

Recorded Matter

The recorded matter production method of the embodiment described above produces a recorded matter including layers, each of which will be described below.

Medium (Recording Medium)

Any substrate (recording medium) may be used for the recording method according to this embodiment. Various substrates may be used, including non-absorbent substrates, such as resin substrates, metal sheets, and glass substrates; absorbent substrates, such as paper sheets and fabrics; and surface-coated substrates, such as absorbing layer-bearing substrates. The same applies to the substrate for use in the recorded matter production method according to another embodiment described below.

Examples of the non-absorbent substrate include substrates of resins, such as polyester resin, polypropylene synthetic paper, vinyl chloride resin, and polyimide resin; and substrates of metal, metallic foil-coated paper, glass, synthetic rubber, and natural rubber.

Examples of the absorbent substrate include woody paper, medium-quality paper, high-quality paper, cotton, chemical fiber fabrics, silk, linen, woven fabrics, non-woven fabrics, and leather.

Examples of the surface-coated substrate include coated paper, art paper, cast paper, lightweight coated paper, and fine coated paper.

In particular, the substrate is preferably an absorbent substrate. The water-based ink containing the organic solvent having a water-octanol partition coefficient of −0.3 or less has a reduced ability to penetrate into the absorbent substrate (recording medium). Such a reduced ability to penetrate into the absorbent substrate (recording medium) can effectively prevent the water-based ink from causing the problem of filling defects, which would otherwise often occur on the absorbent substrate.

Water-Based Ink Layer

A water-based ink layer is formed when the solvent is evaporated from the water-based ink described above. For example, in a case where the water-based ink contains the colorant, the water-based ink layer will serve as a decorative or a recording layer for forming the desired image.

The water-based ink contains the organic solvent having a water-octanol partition coefficient of −0.3 or less. The water-based ink with this feature can form images with high reproducibility while being effectively prevented from causing a local reduction in print density or filling defects.

Overcoat Layer

An overcoat layer is formed when the solvent is evaporated from the overcoat ink described above. The overcoat layer may contain a specific component for providing a desired function. Basically, the overcoat layer is disposed on top of the water-based ink layer. A main purpose of the overcoat layer is to impart scratch resistance to the recorded matter.

Device

An embodiment of the present invention is directed to an ink set ejection device for using the ink set including the pretreatment ink, the water-based ink, and the overcoat ink. Specifically, the ink set ejection device includes at least a pretreatment ink ejection unit that ejects the pretreatment ink; a water-based ink ejection unit that ejects the water-based ink; and an overcoat ink ejection unit, in which the pretreatment ink ejection unit, the water-based ink ejection unit, and the overcoat ink ejection unit are arranged in order along the direction in which the substrate is to be fed.

The water-based ink contains the organic solvent having a water-octanol partition coefficient of −0.3 or less. The water-based ink with this feature has a reduced ability to penetrate into the substrate (recording medium) and can form images with high reproducibility while being effectively prevented from causing a local reduction in print density or filling defects.

When the inks of the ink set have static surface tensions $S_O$, $S_P$, and $S_C$ adjusted to fall within specific ranges satisfying the relation $S_O \leq S_P < S_C$, the water-based ink can be effectively prevented from bleeding even in an inkjet printing method.

The device may include a drying mechanism between the water-based ink ejection unit and the overcoat ink ejection unit and another drying mechanism between the pretreatment ink ejection unit and the water-based ink ejection unit. Alternatively, the device including the pretreatment ink ejection unit, the water-based ink ejection unit, and the overcoat ink ejection unit may include a drying mechanism between the pretreatment ink ejection unit and the water-based ink ejection unit but no drying mechanism between the water-based ink ejection unit and the overcoat ink ejection unit. Alternatively, the device may include a drying mechanism between the water-based ink ejection unit and the overcoat ink ejection unit but no drying mechanism between the pretreatment ink ejection unit and the water-based ink ejection unit. The device of FIG. 1 with no drying mechanism between the water-based ink ejection unit and the overcoat ink ejection unit and no drying mechanism between the pretreatment ink ejection unit and the water-based ink ejection unit can be made compact and have a feed unit with a short entire length to achieve higher speed printing.

Preferably, the device including the pretreatment ink ejection unit, the water-based ink ejection unit, and the overcoat ink ejection unit includes drying mechanisms that respectively dry the inks of the ink set after the ink ejection. The drying mechanism can effectively remove volatile components from each ink and thus more effectively prevent the water-based ink from bleeding.

The drying mechanism for drying the ink after the ejection of the ink may be any suitable type, such as a heater or a mechanism for blowing hot air or room temperature air.

Each of the ejection units may include any ejection system, such as piezo, thermal, or electrostatic system. For all systems, the water-based ink can be effectively prevented from bleeding.

EXAMPLES

Hereinafter, the present invention will be described in more detail with reference to examples, which are not intended to limit the present invention at all.

1. Preparation of Water-Based Inks

Each set of materials were mixed in the ratio (in units of mass %) shown in the table below and stirred at room temperature (20 to 25° C.) for 1 hour. It was then confirmed that no material remained undissolved. Each of the resulting mixtures was then filtered through a membrane filter to give a water-based ink.

2. Evaluation of Water-Based Inks

Measurement of Contact Angle

The water-based inks of the examples and the comparative examples were measured for contact angle. Specifically, each of the water-based inks of the examples and the comparative examples was dropped using a 30 G needle (with a 30 gauge tip (approximately 0.31 mm in size)) onto the surface of a substrate, and 1.0 second after the dropping, the contact angle of the droplet on the substrate surface was measured using a contact angle meter (DMo-701 manufactured by Kyowa Interface Science Co., Ltd.). Substrate: JET Ace W (coated cardboard paper manufactured by Nippon Paper Industries Co., Ltd.)

Evaluation of Ability to Penetrate

The water-based inks of the examples and the comparative examples were evaluated for the ability to penetrate into a substrate. Specifically, each of the water-based inks of the examples and the comparative examples was applied in an amount of 5 g/m² to the substrate using a bar coater, and subsequently, the time taken until the substrate surface was completely exposed as a result of complete transfer of the ink from the substrate surface was measured. Substrate: JET Ace W (coated cardboard paper manufactured by Nippon Paper Industries Co., Ltd.)

Evaluation Criteria

A: The time is 25 seconds or more. B: The time is 20 seconds or more and less than 25 seconds. C: The time is 15 seconds or more and less than 20 seconds. D: The time is 10 seconds or more and less than 15 seconds. E: The time is less than 10 seconds. Rating A, B, or C indicates that the ability of the ink to penetrate into the substrate is practically acceptable.

Evaluation of Solid Printing

The water-based inks of the examples and the comparative examples were evaluated for the ability to produce a solid print. Specifically, using an inkjet printing device with a line head system (single-pass system) having the configuration shown in FIG. 1, the pretreatment ink A-2 shown below and the water-based ink were ejected in sequence onto the surface of a substrate (recording medium) (JET Ace W (coated cardboard paper manufactured by Nippon Paper Industries Co., Ltd.)) being fed at a rate of 50 m/min, so that a recorded matter with a specific print pattern was produced. The degree of filling of the recording surface areas was evaluated based on the criteria below. Evaluation Criteria A: Neither uneven printing nor pinholes are observed, and it is determined that the recording surface areas are sufficiently filled in with the inks (the dots spread with sufficiently large sizes). B: Uneven printing is very slightly observed, but the recording surface areas are filled in with the inks. C: A few of the substrate surface areas remain exposed, but the recording surface areas are filled in with the inks to a practically acceptable extent. D: Some substrate surface areas remain exposed (pinholes), and the recording surface areas are insufficiently filled in with the inks. E: Many substrate surface areas remain exposed. Rating A, B, or C indicates that the ability to produce a solid print is practically acceptable.

TABLE 1

| | | Water-based ink(Example) | | | | | | | |
|---|---|---|---|---|---|---|---|---|---|
| | | 1-1 | 1-2 | 1-3 | 1-4 | 1-5 | 1-6 | 1-7 | 1-8 |
| Water-soluble solvent (Partition coefficient) | 1,3-Propanediol (−1.093) | 35.00 | | | | | | 25.00 | |
| | 1,2-Propanediol (−1.008) | | 35.00 | | | | | | |
| | Triethylene glycol monoethyl ether (−0.656) | | | 35.00 | | | | | |
| | 1,2-Butanediol (−0.499) | | | | 35.00 | | | 10.00 | 25.00 |
| | Diethylene glycol monoethyl ether (−0.421) | | | | | 35.00 | | | |
| | 3-Methyl-1,3-butanediol (−0.329) | | | | | | 35.00 | | |
| | 1,2-Pentanediol (0.011) | | | | | | | | |
| | 3-Methoxy-1-butanol (0.070) | | | | | | | | 10.00 |
| Surfactant | BYK345 | 2.00 | 2.00 | 2.00 | 2.00 | 2.00 | 2.00 | 2.00 | 2.00 |
| | Dynol604 | | | | | | | | |
| Resin | MOVINYL 6820 | 7.00 | 7.00 | 7.00 | 7.00 | 7.00 | 7.00 | 7.00 | 7.00 |
| WAX | AQUACER531 | 0.90 | 0.90 | 0.90 | 0.90 | 0.90 | 0.90 | 0.90 | 0.90 |
| Dispersant | DISPERBYK-190 | 0.50 | 0.50 | 0.50 | 0.50 | 0.50 | 0.50 | 0.50 | 0.50 |
| Pigment | Cyan pigment | 3.50 | 3.50 | 3.50 | 3.50 | 3.50 | 3.50 | 3.50 | 3.50 |
| | Water | 51.10 | 51.10 | 51.10 | 51.10 | 51.10 | 51.10 | 51.10 | 51.10 |
| Evaluation | Contact angle [°] | 21.1 | 23.5 | 18.9 | 24.0 | 20.2 | 22.5 | 18.9 | 21.5 |
| | Penetration time (seconds) | 26 | 22 | 16 | 20 | 18 | 21 | 18 | 15 |
| | Penetration rating | A | B | C | B | C | B | C | C |
| | Solid printing | A | A | C | B | C | B | B | C |

| | | Water-based ink(Example) | | | | Water-based ink (Comparative Example) | | | |
|---|---|---|---|---|---|---|---|---|---|
| | | 1-9 | 1-10 | 1-11 | 1-12 | 1-1 | 1-2 | 1-3 | 1-4 |
| Water-soluble solvent (Partition coefficient) | 1,3-Propanediol (−1.093) | 35.00 | 15.00 | 51.00 | 35.00 | | | | |
| | 1,2-Propanediol (−1.008) | | | | | | | | |
| | Triethylene glycol monoethyl ether (−0.656) | | | | | | | | |
| | 1,2-Butanediol (−0.499) | | | | | | | 5.00 | |
| | Diethylene glycol monoethyl ether (−0.421) | | | | | | | | |
| | 3-Methyl-1,3-butanediol (−0.329) | | | | | | | | |
| | 1,2-Pentanediol (0.011) | | | | | 35.00 | | | 25.00 |
| | 3-Methoxy-1-butanol (0.070) | | | | | | 35.00 | 20.00 | 10.00 |
| Surfactant | BYK345 | | 2.00 | 2.00 | | 2.00 | 2.00 | 2.00 | 2.00 |
| | Dynol604 | 0.90 | | | | | | | |
| Resin | MOVINYL 6820 | 7.00 | 7.00 | 7.00 | 7.00 | 7.00 | 7.00 | 7.00 | 7.00 |
| WAX | AQUACER531 | 0.90 | 0.90 | 0.90 | 0.90 | 0.90 | 0.90 | 0.90 | 0.90 |
| Dispersant | DISPERBYK-190 | 0.50 | 0.50 | 0.50 | 0.50 | 0.50 | 0.50 | 0.50 | 0.50 |
| Pigment | Cyan pigment | 3.50 | 3.50 | 3.50 | 3.50 | 3.50 | 3.50 | 3.50 | 3.50 |
| | Water | 52.20 | 71.10 | 35.10 | 53.10 | 51.10 | 51.10 | 61.10 | 51.10 |
| Evaluation | Contact angle [°] | 24.5 | 19.8 | 28.6 | 30.2 | 18.0 | 28.3 | 35.0 | 23.2 |
| | Penetration time (seconds) | 27 | 23 | 29 | 30 | 10 | 8 | 11 | 8 |
| | Penetration rating | A | B | A | A | D | E | D | E |
| | Solid printing | B | B | C | C | D | E | D | E |

In Table 1, "Cyan pigment" is C.I. Pigment Blue 15:3 (PB15:3).

In the table, "BYK 345" is a silicone (silicon) surfactant manufactured by BYK-Chemie.

In the table, "Dynol 604" is 2,5,8,11-tetramethyl-6-dodecyn-5,8-diol, ethoxylated, manufactured by Evonik Industries.

In the table, "MOVINYL 6820" is an anionic acrylic resin emulsion manufactured by Japan Coating Resin Co., Ltd.

In the table, "AQUACER 531" is a polyethylene wax emulsion manufactured by BYK-Chemie.

In the table, "DISPER BYK-190" is a water-soluble polymer dispersant manufactured by BYK-Chemie.

A black water-based ink, a magenta water-based ink, and a yellow water-based ink were also prepared in the same manner as in the preparation of the cyan water-based ink shown above, except that carbon black (C.I. Pigment Black 7), C.I. Pigment Red 122 (PR 122), and C.I. Pigment Yellow 74 (PY 74) were each used instead of C.I. Pigment Blue 15:3. Each of the water-based inks with the different colorants had the same level of static surface tension as that of the cyan water-based ink shown above.

Table 1 shows that each of the water-based inks of the examples, which contains the organic solvent having a water-octanol partition coefficient of −0.3 or less, has a reduced ability to penetrate into the absorbent substrate, is less likely to cause pinholes or filling defects, and can produce recorded matters with high image reproducibility.

In particular, the water-based inks of Examples A-1, A-2, A-4, and A-6, which contain an alkanediol with a water-octanol partition coefficient of −0.3 or less, have a lower ability to penetrate into the absorbent substrate and are much less likely to cause pinholes than the water-based ink of Example A-3 or A-5. The water-based ink of Example A-1, which contains a silicone (silicon) surfactant, also has a higher ability to form a solid print than the water-based ink of Example A-9 or A-12.

3. Preparation of Pretreatment Inks

Each set of materials were mixed in the ratio (in units of mass %) shown in the table below and stirred at room temperature (20 to 25° C.) for 1 hour. It was then confirmed that no material remained undissolved. Each of the resulting mixtures was then filtered through a membrane filter to give a pretreatment ink, which was measured for contact angle as shown above.

TABLE 2

| Water-soluble solvent | | Pretreatment ink A | | | | | | | | |
|---|---|---|---|---|---|---|---|---|---|---|
| | | A-1 | A-2 | A-3 | A-4 | A-5 | A-6 | A-7 | A-8 | A-9 |
| Water-soluble solvent | 1,2-Butanediol | 15.00 | | | | | | | | 15.00 |
| | 1,2-Pentanediol | | 15.00 | | | | | | 15.00 | |
| | 1,2- Hexanediol | | | 15.00 | | | | | | |
| | Propylene glycol | | | | 15.00 | | | | | |
| | 3-Methoxy-1-butanol | | | | | 15.00 | | | | |
| | 1,5-Pentanediol | | | | | | 15.00 | | | |
| | 1, 3-Propanediol | | | | | | | 15.00 | | |
| | Glycerol | | | | | | | | | |
| | triethylene glycol monoethyl ether | | | | | | | | | |
| | Trimethylolpropane | | | | | | | | | |
| | N-Hydroxyethylene urea | | | | | | | | | |
| Surfactant | OLFINE E-1010 | 1.00 | 1.00 | 1.00 | 1.00 | 1.00 | 1.00 | 1.00 | 1.00 | |
| | BYK345 | | | | | | | | | 2.00 |
| Resin | HYDRAN CP-7050 | 3.00 | 3.00 | 3.00 | 3.00 | 3.00 | 3.00 | 3.00 | 3.00 | 3.00 |
| Reactant | Unisense KHE 100L | 1.50 | 1.50 | 1.50 | 1.50 | 1.50 | 1.50 | 1.50 | | 1.50 |
| | Calcium acetate | | | | | | | | 1.50 | |
| | Water | 79.50 | 79.50 | 79.50 | 79.50 | 79.50 | 79.50 | 79.50 | 79.50 | 78.50 |
| Evaluation | Contact angle [°] | 14.8 | 8 | 10.3 | 17.5 | 3.6 | 21.7 | 19.4 | 13.3 | 8.7 |
| | Penetration time (seconds) | 8 | 6 | 8 | 12 | 6 | 16 | 10 | 6 | 5 |
| | Penetration rating | A | A | A | B | A | C | B | A | A |
| | Solid printing | B | A | B | C | A | C | C | B | A |

| | | Pretreatment ink A | | | | Pretreatment ink B | | | |
|---|---|---|---|---|---|---|---|---|---|
| | | A-10 | A-11 | A-12 | A-13 | B-1 | B-2 | B-3 | B-4 |
| Water-soluble solvent | 1,2-Butanediol | 25.00 | 10.00 | 10.00 | 10.00 | | | | |
| | 1,2-Pentanediol | | | | | | | | |
| | 1,2- Hexanediol | | | | | | | | |
| | Propylene glycol | | | | | | | | |
| | 3-Methoxy-1-butanol | | 10.00 | 15.00 | 15.00 | | | | |
| | 1,5-Pentanediol | | | | | | | | |
| | 1, 3-Propanediol | | | | | | | | |
| | Glycerol | | | | | 15.00 | | | |
| | triethylene glycol monoethyl ether | | | | | | 15.00 | | |
| | Trimethylolpropane | | | | | | | 15.00 | |
| | N-Hydroxyethylene urea | | | | | | | | 15.00 |
| Surfactant | OLFINE E-1010 | | | | | 1.00 | 1.00 | 1.00 | 1.00 |
| | BYK345 | 2.00 | 2.00 | 2.00 | | | | | |
| Resin | HYDRAN CP-7050 | 3.00 | 3.00 | 3.00 | 3.00 | 3.00 | 3.00 | 3.00 | 3.00 |
| Reactant | Unisense KHE 100L | 1.50 | 1.50 | 1.50 | 1.50 | 1.50 | 1.50 | 1.50 | 1.50 |
| | Calcium acetate | | | | | | | | |
| | Water | 68.50 | 73.50 | 68.50 | 70.50 | 79.50 | 79.50 | 79.50 | 79.50 |
| Evaluation | Contact angle [°] | 11.8 | 2.4 | 2.4 | 23.4 | 8.7 | 64.3 | 25.6 | 28.9 |
| | Penetration time (seconds) | 11 | 5 | 5 | 11 | 23 | 16 | 30 | 21 |
| | Penetration rating | B | A | A | B | D | C | E | D |
| | Solid printing | B | A | A | C | D | D | E | E |

In the table, "OLFINE E-1010" is an acetylene glycol surfactant manufactured by Nissin Chemical Co., Ltd.

In the table, "BYK 345" is a silicone (silicon) surfactant manufactured by BYK-Chemie.

In the table, "HYDRAN CP-7050" is a cationic urethane resin emulsion manufactured by DIC Corporation.

In the table, "Unisense KHE 100L" is a water-soluble quaternary ammonium salt type resin manufactured by Senka Corporation.

4. Preparation of Overcoat Inks

Each set of materials shown in Table 3 or 4 were mixed and stirred at room temperature (20 to 25° C.) for 1 hour. It was then confirmed that no material remained undissolved. The resulting mixtures were each then filtered through a membrane filter to give overcoat inks (OP1 to OP37).

Each of overcoat inks OP1 to OP37 was used to form an overcoat layer. The surface of the resulting overcoat layer was measured for sliding angle. Specifically, the overcoat ink was applied to an MF paper sheet (coated cardboard paper manufactured by Ojimateria Co., Ltd.) using a bar coater #4 and dried to form an overcoat layer. The angle at which sliding on the overcoat layer surface started (sliding angle) was then measured using a friction tester (AN-S2 manufactured by Toyo Seiki Seisaku-sho, Ltd.).

TABLE 3

| | Resin product name | Resin type | Tg | OP1 | OP2 | OP3 | OP4 | OP5 | OP6 | OP7 | OP8 | OP9 | OP10 |
|---|---|---|---|---|---|---|---|---|---|---|---|---|---|
| Resin | Carboset GA7439 | Acrylic | 31 | 14.0 | | | | | | | | | |
| | MOVINYL 6899D | Acrylic | 48 | | 14.0 | | | | | | | | |
| | MOVINYL 6969D | Acrylic | 73 | | | 14.0 | | | | | | | |
| | NeoCry XK-190 | Acrylic | 80 | | | | 14.0 | | | | | | |
| | JE-1056 | Acrylic | 82 | | | | | 14.0 | | | | | |

TABLE 3-continued

| | Resin product name | Resin type | Tg | | | | | | | | | | |
|---|---|---|---|---|---|---|---|---|---|---|---|---|---|
| | MOVINYL 6810 | Acrylic | 110 | | | | | | 14.0 | | | | |
| | TAKELAC W-6061 | Urethane | 25 | | | | | | | 14.0 | | | |
| | TAKELAC W-5661 | Urethane | 70 | | | | | | | | 14.0 | | |
| | TAKELAC WS4022 | Urethane | 115 | | | | | | | | | 14.0 | |
| | Sancure 815 | Urethane | 161 | | | | | | | | | | 14.0 |
| | Sancure777F | Urethane | 162 | | | | | | | | | | |
| | Elitel KZT-8803 | Polyester | 61 | | | | | | | | | | |
| | Elitel KZT-3556S | Polyester | 81 | | | | | | | | | | |
| | NeoCryl A-2092 | Acrylic-styrene | 8 | | | | | | | | | | |
| | JONCRYL PDX-7430 | Acrylic-styrene | 30 | | | | | | | | | | |
| | QE-1042 | Acrylic-styrene | 53 | | | | | | | | | | |
| | NeoCryl A-639 | Acrylic-styrene | 62 | | | | | | | | | | |
| | JONCRYL PDX-7538 | Acrylic-styrene | 75 | | | | | | | | | | |
| | JONCRYL PDX-7696 | Acrylic-styrene | 86 | | | | | | | | | | |
| | NeoCryl A-662 | Acrylic-styrene | 95 | | | | | | | | | | |
| | KE-1048 | Acrylic-styrene | 96 | | | | | | | | | | |
| | NeoCryl A-2091 | Acrylic-styrene | 98 | | | | | | | | | | |
| | NeoCryl XK-190 | Acrylic | 0 | | | | | | | | | | |
| | BONRON PS-001 | Acrylic | 3 | | | | | | | | | | |
| | neocryl A1125 | Acrylic | 13 | | | | | | | | | | |
| | TAKELAC W-6110 | Urethane | −20 | | | | | | | | | | |
| | Elitel KZT-9204 | Polyester | 19 | | | | | | | | | | |
| | Joncryl ECO 2124 | Acrylic-styrene | −35 | | | | | | | | | | |
| | NE2260 | Acrylic-styrene | −10 | | | | | | | | | | |
| | ACRIT UW-550CS | Acrylic-styrene | 4 | | | | | | | | | | |
| | J-140A | Acrylic-styrene | 5 | | | | | | | | | | |
| Wax | AQUACER531 | | | 1.0 | 1.0 | 1.0 | 1.0 | 1.0 | 1.0 | 1.0 | 1.0 | 1.0 | 1.0 |
| Surfactant | BYK345 | | | 3.0 | 3.0 | 3.0 | 3.0 | 3.0 | 3.0 | 3.0 | 3.0 | 3.0 | 3.0 |
| | Dynol604 | | | | | | | | | | | | |
| Solvent | Propylene glycol | | | 35.0 | 35.0 | 35.0 | 35.0 | 35.0 | 35.0 | 35.0 | 35.0 | 35.0 | 35.0 |
| | Water | | | 47.0 | 47.0 | 47.0 | 47.0 | 47.0 | 47.0 | 47.0 | 47.0 | 47.0 | 47.0 |
| | Sliding angle | | | 25.0 | 24.8 | 23.9 | 24.1 | 22.9 | 22.5 | 25.0 | 22.4 | 13.0 | 17.4 |

| | Resin product name | Resin type | Tg | OP11 | OP12 | OP13 | OP14 | OP15 | OP16 | OP17 | OP18 | OP19 |
|---|---|---|---|---|---|---|---|---|---|---|---|---|
| Resin | Carboset GA7439 | Acrylic | 31 | | | | | | | | | |
| | MOVINYL 6899D | Acrylic | 48 | | | | | | | | | |
| | MOVINYL 6969D | Acrylic | 73 | | | | | | | | | |
| | NeoCry XK-190 | Acrylic | 80 | | | | | | | | | |
| | JE-1056 | Acrylic | 82 | | | | | | | | | |
| | MOVINYL 6810 | Acrylic | 110 | | | | | | | | | |
| | TAKELAC W-6061 | Urethane | 25 | | | | | | | | | |
| | TAKELAC W-5661 | Urethane | 70 | | | | | | | | | |
| | TAKELAC WS4022 | Urethane | 115 | | | | | | | | | |
| | Sancure 815 | Urethane | 161 | | | | | | | | | |
| | Sancure777F | Urethane | 162 | 14.0 | | | | | | | | |
| | Elitel KZT-8803 | Polyester | 61 | | 14.0 | | | | | | | |
| | Elitel KZT-3556S | Polyester | 81 | | | 14.0 | | | | | | |
| | NeoCryl A-2092 | Acrylic-styrene | 8 | | | | 14.0 | | | | | |
| | JONCRYL PDX-7430 | Acrylic-styrene | 30 | | | | | 14.0 | | | | |
| | QE-1042 | Acrylic-styrene | 53 | | | | | | 14.0 | | | |
| | NeoCryl A-639 | Acrylic-styrene | 62 | | | | | | | 14.0 | | |
| | JONCRYL PDX-7538 | Acrylic-styrene | 75 | | | | | | | | 14.0 | |
| | JONCRYL PDX-7696 | Acrylic-styrene | 86 | | | | | | | | | 14.0 |
| | NeoCryl A-662 | Acrylic-styrene | 95 | | | | | | | | | |
| | KE-1048 | Acrylic-styrene | 96 | | | | | | | | | |
| | NeoCryl A-2091 | Acrylic-styrene | 98 | | | | | | | | | |
| | NeoCryl XK-190 | Acrylic | 0 | | | | | | | | | |
| | BONRON PS-001 | Acrylic | 3 | | | | | | | | | |
| | neocryl A1125 | Acrylic | 13 | | | | | | | | | |
| | TAKELAC W-6110 | Urethane | −20 | | | | | | | | | |
| | Elitel KZT-9204 | Polyester | 19 | | | | | | | | | |
| | Joncryl ECO 2124 | Acrylic-styrene | −35 | | | | | | | | | |
| | NE2260 | Acrylic-styrene | −10 | | | | | | | | | |
| | ACRIT UW-550CS | Acrylic-styrene | 4 | | | | | | | | | |
| | J-140A | Acrylic-styrene | 5 | | | | | | | | | |
| Wax | AQUACER531 | | | 1.0 | 1.0 | 1.0 | 1.0 | 1.0 | 1.0 | 1.0 | 1.0 | 1.0 |
| Surfactant | BYK345 | | | 3.0 | 3.0 | 3.0 | 3.0 | 3.0 | 3.0 | 3.0 | 3.0 | 3.0 |
| | Dynol604 | | | | | | | | | | | |
| Solvent | Propylene glycol | | | 35.0 | 35.0 | 35.0 | 35.0 | 35.0 | 35.0 | 35.0 | 35.0 | 35.0 |
| | Water | | | 47.0 | 47.0 | 47.0 | 47.0 | 47.0 | 47.0 | 47.0 | 47.0 | 47.0 |
| | Sliding angle | | | 12.6 | 22.7 | 22.1 | 20.9 | 23.4 | 21.7 | 21.2 | 20.6 | 19.0 |

TABLE 4

| | Resin product name | Resin type | Tg | OP20 | OP21 | OP22 | OP23 | OP24 | OP25 | OP26 | OP27 | OP28 |
|---|---|---|---|---|---|---|---|---|---|---|---|---|
| Resin | Carboset GA7439 | Acrylic | 31 | | | | | | | | | |
| | MOVINYL 6899D | Acrylic | 48 | | | | | | | | | |
| | MOVINYL 6969D | Acrylic | 73 | | | | | | | | | |
| | NeoCry XK-190 | Acrylic | 80 | | | | | | | | | |
| | JE-1056 | Acrylic | 82 | | | | 14.0 | 14.0 | 14.0 | 14.0 | 5.0 | 14.0 |
| | MOVINYL 6810 | Acrylic | 110 | | | | | | | | | |
| | TAKELAC W-6061 | Urethane | 25 | | | | | | | | | |
| | TAKELAC W-5661 | Urethane | 70 | | | | | | | | | |
| | TAKELAC WS4022 | Urethane | 115 | | | | | | | | | |
| | Sancure 815 | Urethane | 161 | | | | | | | | | |
| | Sancure777F | Urethane | 162 | | | | | | | | | |
| | Elitel KZT-8803 | Polyester | 61 | | | | | | | | | |
| | Elitel KZT-3556S | Polyester | 81 | | | | | | | | | |
| | NeoCryl A-2092 | Acrylic-styrene | 8 | | | | | | | | | |
| | JONCRYL PDX-7430 | Acrylic-styrene | 30 | | | | | | | | | |
| | QE-1042 | Acrylic-styrene | 53 | | | | | | | | | |
| | NeoCryl A-639 | Acrylic-styrene | 62 | | | | | | | | | |
| | JONCRYL PDX-7538 | Acrylic-styrene | 75 | | | | | | | | | |
| | JONCRYL PDX-7696 | Acrylic-styrene | 86 | | | | | | | | | |
| | NeoCryl A-662 | Acrylic-styrene | 95 | 14.0 | | | | | | | | |
| | KE-1048 | Acrylic-styrene | 96 | | 14.0 | | | | | | | |
| | NeoCryl A-2091 | Acrylic-styrene | 98 | | | 14.0 | | | | | | |
| | NeoCryl XK-190 | Acrylic | 0 | | | | | | | | | |
| | BONRON PS-001 | Acrylic | 3 | | | | | | | | | |
| | neocryl A1125 | Acrylic | 13 | | | | | | | | | |
| | TAKELAC W-6110 | Urethane | −20 | | | | | | | | | |
| | Elitel KZT-9204 | Polyester | 19 | | | | | | | | | |
| | Joncryl ECO 2124 | Acrylic-styrene | −35 | | | | | | | | | |
| | NE2260 | Acrylic-styrene | −10 | | | | | | | | | |
| | ACRIT UW-550CS | Acrylic-styrene | 4 | | | | | | | | | |
| | J-140A | Acrylic-styrene | 5 | | | | | | | | | |
| Wax | AQUACER531 | | | 1.0 | 1.0 | 1.0 | 1.0 | 1.0 | 1.0 | 1.0 | 1.0 | 1.0 |
| Surfactant | BYK345 | | | 3.0 | 3.0 | 3.0 | 3.5 | | 3.5 | 2.0 | 2.5 | |
| | Dynol604 | | | | | | | 3.0 | | | | 0.5 |
| Solvent | Propylene glycol | | | 35.0 | 35.0 | 35.0 | 30.0 | 25.0 | 20.0 | 30.0 | 35.0 | 35.0 |
| | Water | | | 47.0 | 47.0 | 47.0 | 51.5 | 57.0 | 61.5 | 53.0 | 56.5 | 49.5 |
| | Sliding angle | | | 19.4 | 20.6 | 22.6 | 22.9 | 22.9 | 22.9 | 22.9 | 22.9 | 22.9 |

| | Resin product name | Resin type | Tg | OP29 | OP30 | OP31 | OP32 | OP33 | OP34 | OP35 | OP36 | OP37 |
|---|---|---|---|---|---|---|---|---|---|---|---|---|
| Resin | Carboset GA7439 | Acrylic | 31 | | | | | | | | | |
| | MOVINYL 6899D | Acrylic | 48 | | | | | | | | | |
| | MOVINYL 6969D | Acrylic | 73 | | | | | | | | | |
| | NeoCry XK-190 | Acrylic | 80 | | | | | | | | | |
| | JE-1056 | Acrylic | 82 | | | | | | | | | |
| | MOVINYL 6810 | Acrylic | 110 | | | | | | | | | |
| | TAKELAC W-6061 | Urethane | 25 | | | | | | | | | |
| | TAKELAC W-5661 | Urethane | 70 | | | | | | | | | |
| | TAKELAC WS4022 | Urethane | 115 | | | | | | | | | |
| | Sancure 815 | Urethane | 161 | | | | | | | | | |
| | Sancure777F | Urethane | 162 | | | | | | | | | |
| | Elitel KZT-8803 | Polyester | 61 | | | | | | | | | |
| | Elitel KZT-3556S | Polyester | 81 | | | | | | | | | |
| | NeoCryl A-2092 | Acrylic-styrene | 8 | | | | | | | | | |
| | JONCRYL PDX-7430 | Acrylic-styrene | 30 | | | | | | | | | |
| | QE-1042 | Acrylic-styrene | 53 | | | | | | | | | |
| | NeoCryl A-639 | Acrylic-styrene | 62 | | | | | | | | | |
| | JONCRYL PDX-7538 | Acrylic-styrene | 75 | | | | | | | | | |
| | JONCRYL PDX-7696 | Acrylic-styrene | 86 | | | | | | | | | |
| | NeoCryl A-662 | Acrylic-styrene | 95 | | | | | | | | | |
| | KE-1048 | Acrylic-styrene | 96 | | | | | | | | | |
| | NeoCryl A-2091 | Acrylic-styrene | 98 | | | | | | | | | |
| | NeoCryl XK-190 | Acrylic | 0 | 14.0 | | | | | | | | |
| | BONRON PS-001 | Acrylic | 3 | | 14.0 | | | | | | | |
| | neocryl A1125 | Acrylic | 13 | | | 14.0 | | | | | | |
| | TAKELAC W-6110 | Urethane | −20 | | | | 14.0 | | | | | |
| | Elitel KZT-9204 | Polyester | 19 | | | | | 14.0 | | | | |
| | Joncryl ECO 2124 | Acrylic-styrene | −35 | | | | | | 14.0 | | | |
| | NE2260 | Acrylic-styrene | −10 | | | | | | | 14.0 | | |
| | ACRIT UW-550CS | Acrylic-styrene | 4 | | | | | | | | 14.0 | |
| | J-140A | Acrylic-styrene | 5 | | | | | | | | | 14.0 |
| Wax | AQUACER531 | | | 1.0 | 1.0 | 1.0 | 1.0 | 1.0 | 1.0 | 1.0 | 1.0 | 1.0 |
| Surfactant | BYK345 | | | 3.0 | 3.0 | 3.0 | 3.0 | 3.0 | 3.0 | 3.0 | 3.0 | 3.0 |
| | Dynol604 | | | | | | | | | | | |
| Solvent | Propylene glycol | | | 35.0 | 35.0 | 35.0 | 35.0 | 35.0 | 35.0 | 35.0 | 35.0 | 35.0 |
| | Water | | | 47.0 | 47.0 | 47.0 | 47.0 | 47.0 | 47.0 | 47.0 | 47.0 | 47.0 |
| | Sliding angle | | | 52.8 | 54.1 | 36.0 | 42.0 | 45.4 | 33.8 | 31.1 | 28.4 | 28.0 |

In the tables, "AQUACER 531" is a polyethylene wax emulsion manufactured by BYK-Chemie. In the tables, "BYK 345" is a silicone (silicon) surfactant manufactured by BYK-Chemie. In the tables, "Dynol 604" is 2,5,8,11-tetramethyl-6-dodecyn-5,8-diol, ethoxylated, manufactured by Evonik Industries.

5. Evaluation of Ink Sets

Ink sets each including the pretreatment ink, the water-based ink, and the overcoat ink were used and evaluated for bleeding. Specifically, using an inkjet printing device with a line head system (single-pass system) having the configuration shown in FIG. 1, the pretreatment ink, the water-based ink, and the overcoat ink were ejected in sequence onto the surface of a substrate (recording medium) (OK Bouru (coated cardboard paper) manufactured by Ojimateria Co., Ltd.) being fed at a rate of 50 m/min, so that a recorded matter with a specific print pattern was produced.
Evaluation of Bleeding Whether and how the recorded matter was blurred was visually evaluated based on the criteria below. Evaluation Criteria A: No blurring is observed, and the image is clear. B: Very slight blurring is observed, but the image is clear. C: A little blurring is observed, but the image is practically acceptable. D: Blurring is observed, and no clear image is obtained. E: Significant blurring is observed.
Evaluation of Cissing The recorded matter was visually evaluated for cissing based on the criteria below. Evaluation Criteria A: No cissing is observed, and the recording surface areas are determined to be sufficiently filled with the inks. B: Very slight cissing is observed, but the recording surface areas are determined to be filled with the inks. C: Slight cissing is observed, but the recording surface areas are determined to be filled to a practically acceptable extent with the inks. D: Cissing is observed, and the recording surface areas are insufficiently filled with the inks. E: Significant cissing is observed.

Evaluation of Ability to Penetrate

The pretreatment ink was applied in an amount of 5 g/m² to the substrate using a bar coater, and subsequently, the time taken until the substrate surface was completely exposed as a result of the complete transfer of the ink from the substrate surface was measured. Evaluation Criteria A: The time is less than 10 seconds. B: The time is 10 seconds or more and less than 15 seconds. C: The time is 15 seconds or more and less than 20 seconds. D: The time is 20 seconds or more and less than 25 seconds. E: The time is 25 seconds or more.
Evaluation of Scratch Resistance The recorded matter was evaluated for scratch resistance. Specifically, the recorded matter sample was evaluated based on the criteria below after the recording surface was rubbed with Shirting No. 3 (cotton) being reciprocated 100 times under a load of 500 g in Color Fastness Rubbing Tester (AB-301 manufactured by Tester Sangyo Co., Ltd.). Evaluation Criteria A: The ink film (overcoat layer or water-based ink layer) is not rubbed off at all. B: The area of the ink film (overcoat layer or water-based ink layer) rubbed off is less than 10% of the total test area. C: The area of the ink film (overcoat layer or water-based ink layer) rubbed off is 10% or more and less than 20% of the total test area. D: The area of the ink film (overcoat layer or water-based ink layer) rubbed off is 20% or more and less than 50% of the total test area. E: The area of the ink film (overcoat layer or water-based ink layer) rubbed off is 50% or more of the total test area.
Evaluation of Gloss The 60° gloss of the recorded matter was measured using a gloss meter (Phopoint IQ-S manufactured by Rhopoint Instruments) and evaluated based on the criteria below. A: The gloss value is 35 or more. B: The gloss value is 30 or more and less than 35. C: The gloss value is 25 or more and less than 30. D: The gloss value is 20 or more and less than 25. E: The gloss value is less than 20.
Sliding Angle The angle at which sliding on the overcoat layer surface of the print started (sliding angle) was measured using a friction tester (AN-S2 manufactured by Toyo Seiki Seisaku-sho, Ltd.).

TABLE 5

| | Pretreatment ink | | Water-based ink Type | | | | | Overcoat ink | | |
| | Type | $S_P$ | BK | C | M | Y | $S_C$ | Type | $S_O$ | $S_C - S_P$ |
|---|---|---|---|---|---|---|---|---|---|---|
| Example2-1 | A-12 | 22.5 | Example1-1 | Example1-1 | Example1-1 | Example1-1 | 23.5 | OP 5 | 22.5 | 1.0 |
| Example2-2 | A-12 | 22.5 | Example1-1 | Example1-1 | Example1-1 | Example1-1 | 23.5 | OP 2 3 | 22 | 1.0 |
| Example2-3 | A-12 | 22.5 | Example1-4 | Example1-4 | Example1-4 | Example1-4 | 26 | OP 2 3 | 22 | 3.5 |
| Example2-4 | A-1 | 24.5 | Example1-6 | Example1-6 | Example1-6 | Example1-6 | 27 | OP 2 3 | 22 | 2.5 |
| Example2-5 | A-1 | 24.5 | Example1-9 | Example1-9 | Example1-9 | Example1-9 | 30 | OP 2 4 | 24 | 5.5 |
| Example2-6 | A-7 | 28 | Example1-9 | Example1-9 | Example1-9 | Example1-9 | 30 | OP 2 4 | 24 | 2.0 |
| Example2-7 | A-12 | 22.5 | Example1-4 | Example1-4 | Example1-4 | Example1-4 | 26 | OP 5 | 22.5 | 3.5 |
| Example2-8 | A-1 | 24.5 | Example1-9 | Example1-9 | Example1-9 | Example1-9 | 30 | OP 2 5 | 21.5 | 5.5 |
| Example2-9 | A-12 | 22.5 | Example1-2 | Example1-2 | Example1-2 | Example1-2 | 23 | OP 5 | 22.5 | 0.5 |
| Example2-10 | A-12 | 22.5 | Example1-1 | Example1-1 | Example1-1 | Example1-1 | 23.5 | OP 2 6 | 23.5 | 1.0 |
| Example2-11 | A-12 | 22.5 | Example1-1 | Example1-1 | Example1-1 | Example1-1 | 23.5 | OP 2 7 | 22 | 1.0 |
| Example2-12 | A-1 | 24.5 | Example1-1 | Example1-1 | Example1-1 | Example1-1 | 23.5 | OP 2 4 | 24 | −1.0 |
| Example2-13 | A-1 | 24.5 | Example1-1 | Example1-1 | Example1-1 | Example1-1 | 23.5 | OP 2 8 | 30 | −1.0 |
| Example2-14 | A-7 | 28.0 | Example1-1 | Example1-1 | Example1-1 | Example1-1 | 23.5 | OP 2 8 | 30 | −4.5 |
| Example2-15 | A-12 | 22.5 | Example1-1 | Example1-1 | Example1-1 | Example1-1 | 23.5 | OP 3 0 | 22.5 | 1.0 |

TABLE 5-continued

| | | | Evaluation | | | | | |
|---|---|---|---|---|---|---|---|---|
| | $S_P - S_O$ | $S_C - S_O$ | Bleeding | Cissing | Penetration | Scratch resistance | Gloss | Sliding properties |
| Example2-1 | 0.0 | 1.0 | B | A | A | A | A | 22.9 |
| Example2-2 | 0.5 | 1.5 | A | A | A | A | A | 22.9 |
| Example2-3 | 0.5 | 4.0 | A | B | A | A | A | 22.9 |
| Example2-4 | 2.5 | 5.0 | B | A | A | A | A | 22.9 |
| Example2-5 | 0.5 | 6.0 | B | C | A | B | A | 24 |
| Example2-6 | 4.0 | 6.0 | B | A | B | A | A | 22.9 |
| Example2-7 | 0.0 | 3.5 | B | B | A | A | A | 22.9 |
| Example2-8 | 3.0 | 8.5 | B | C | A | B | A | 24 |
| Example2-9 | 0.0 | 0.5 | C | A | A | A | B | 23.5 |
| Example2-10 | −1.0 | 0.0 | C | B | A | A | B | 23.8 |
| Example2-11 | 0.5 | 1.5 | A | A | A | C | C | 25.4 |
| Example2-12 | 0.5 | −0.5 | D | E | A | E | D | 27.6 |
| Example2-13 | −5.5 | −6.5 | E | D | A | D | E | 27.6 |
| Example2-14 | −2.0 | −6.5 | E | B | D | A | D | 26.5 |
| Example2-15 | 0.0 | 1.0 | B | A | A | A | A | 54.1 |

Table 5 shows that using the ink set including the water-based ink containing the organic solvent having a water-octanol partition coefficient of −0.3 or less and including the pretreatment ink, the water-based ink, and the overcoat ink having static surface tensions adjusted to fall within the specified ranges makes it possible to produce recorded matters with high image reproducibility and with less pinholes while preventing the water-based ink from bleeding and from causing filling defects even when high-speed inkjet printing is performed using the ink set.

In particular, using the ink set of Example 2-2 with $S_P–S_O$ being at least 0.2 has made it possible to prevent the water-based ink from bleeding more effectively than using the ink set of Example 2-1, 2-7, 2-9, or 2-10. Using the ink set of Example 2-2 with $S_P–S_O$ being at most 3.5 has also made it possible to prevent the water-based ink from bleeding more effectively than using the ink set of Example 2-6.

Using the ink set of Example 2-2 with $S_C–S_P$ being at most 3.0 has also made it possible to prevent the water-based ink from causing cissing more effectively than using the ink set of Example 2-3.

Using the ink set of Example 2-2 with $S_C–S_O$ being at most 4.5 has also made it possible to prevent the water-based ink from bleeding more effectively than using the ink set of Example 2-5, 2-6, or 2-8.

Using the ink set of Example 2-1, in which the overcoat ink (OP5) contains (a) a resin with a glass transition temperature of at least 20° C. and/or (b) a styrene-acrylic resin with a glass transition temperature of at least 6° C., has provided a relatively small sliding angle. This suggests that using the ink set including such an overcoat ink makes it possible to form a smoother overcoat layer, for example, which will allow high-speed, one-by-one feeding of recorded matters from a stack of recorded matters under a relatively high load.

On the other hand, using the ink set of Example 2-15, in which the overcoat ink (OP30) contains a resin with a glass transition temperature of at most 10° C., has provided a relatively large sliding angle. This suggests that using the ink set including such an overcoat ink makes it possible to form a less-smooth overcoat layer, for example, which will prevent recorded matters from sliding out of a stack of recorded matters due to vibration during transportation or storage.

The invention claimed is:

1. An ink set comprising:
a pretreatment ink containing a reaction solution and a resin different from the reaction solution, wherein at least part of the resin is contained as a resin emulsion; and
a water-based ink comprising at least: a colorant, water, and an organic solvent,
the colorant comprising a pigment,
the organic solvent comprising an organic solvent having a water-octanol partition coefficient of −0.3 or less and
the water-based ink is applied on the pretreatment ink, wherein the water-based ink and the pretreatment ink have static surface tensions satisfying the following relation;
the static surface tension $S_P$ of the pretreatment ink<the static surface tension $S_C$ of the water-based ink.

2. The ink set according to claim 1, wherein the organic solvent comprises an alkanediol-typed organic solvent having a water-octanol partition coefficient of −0.3 or less.

3. The ink set according to claim 1, wherein the content of the organic solvent having a water-octanol partition coefficient of −0.3 or less is 1 mass % or more and 50 mass % or less based on the total mass of the water-based ink.

4. The ink set according to claim 1, wherein the water-based ink further comprises a surfactant,
wherein the surfactant comprises a silicone-based surfactant and/or an acetylene glycol-based surfactant.

5. The ink set according to claim 1, wherein the water-based ink and the pretreatment ink are to be jetted by an inkjet method.

6. The ink set according to claim 1, further comprising an overcoat ink for forming an overcoat layer on a surface of a recorded matter.

7. The ink set according to claim 6, wherein the pretreatment ink, the water-based ink, and the overcoat ink have static surface tensions satisfying the following relation:
the static surface tension $S_O$ of the overcoat ink≤the static surface tension $S_P$ of the pretreatment ink<the static surface tension $S_C$ of the water-based ink.

8. An inkjet recording method using the ink set according to claim 1,
the inkjet recording method comprising jetting each of the inks comprised in the ink set onto a substrate by an inkjet method.

9. The inkjet recording method according to claim 8, wherein each of the inks comprised in the ink set is jetted onto the substrate by an inkjet method, such that drying mechanism is not placed between at least one adjacent pairs of ejection parts jetting each of the inks comprised in the ink set.

10. The inkjet recording method according to claim 8, further comprising drying each of the inks comprised in the ink set after the ink jetting.

11. A method of producing a recorded matter using the ink set according to claim 1, the method comprising jetting each of the inks of the ink set onto a substrate.

12. A device for jetting the inks comprised in the ink set by an inkjet method according to claim 1.

13. The device according to claim 12, wherein the device comprises ejection units for respectively jetting the inks comprised in the ink set by an inkjet method, and the device has no drying mechanism between at least one of adjacent pairs of the ejection units.

14. The device according to claim 12, further comprising drying mechanisms for respectively drying the inks of the ink set after ink jetting.

15. A recorded matter comprising:

a recording medium;

a water-based ink layer made from the water-based ink comprised in the ink set according to claim 1; and an overcoat layer provided on top of the water-based ink layer.

16. The ink set according to claim 2, wherein the content of the organic solvent having a water-octanol partition coefficient of −0.3 or less is 1 mass % or more and 50 mass % or less based on the total mass of the water-based ink.

17. The ink set according to claim 2, wherein the water-based ink further comprises a surfactant, wherein the surfactant comprises a silicone-based surfactant and/or an acetylene glycol-based surfactant.

18. The ink set according to claim 2, wherein the water-based ink is to be jetted by an inkjet method.

19. The ink set according to claim 1, wherein the static surface tension relationship further satisfies: $S_C - S_P \geq 0.5$ mN/m and $S_C - S_P \leq 7.0$ mN/m.

\* \* \* \* \*